(12) United States Patent
Kim

(10) Patent No.: US 8,280,272 B2
(45) Date of Patent: Oct. 2, 2012

(54) HIGH-VOLTAGE POWER SUPPLY OF IMAGE FORMING APPARATUS

(75) Inventor: Dong-woo Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 145 days.

(21) Appl. No.: 12/721,653

(22) Filed: Mar. 11, 2010

(65) Prior Publication Data

US 2011/0058842 A1    Mar. 10, 2011

(30) Foreign Application Priority Data

Sep. 8, 2009  (KR) .................................. 2009-84433

(51) Int. Cl.
*G03G 15/00* (2006.01)

(52) U.S. Cl. ........................................... 399/88; 399/37

(58) Field of Classification Search .................... 399/88, 399/37; 307/31
See application file for complete search history.

(56) References Cited

U.S. PATENT DOCUMENTS

| | | | | |
|---|---|---|---|---|
| 2002/0154919 A1* | 10/2002 | Nakaya | ........................ | 399/88 X |
| 2004/0208667 A1* | 10/2004 | Nakaya | ............................ | 399/88 |
| 2007/0092284 A1* | 4/2007 | Choi | ............................... | 399/88 |
| 2011/0038645 A1* | 2/2011 | Oh et al. | ......................... | 399/37 |

* cited by examiner

*Primary Examiner* — Sophia S Chen

(74) *Attorney, Agent, or Firm* — Stanzione & Kim, LLP

(57) ABSTRACT

A high-voltage power supply usable in an image forming apparatus includes a power transformation unit that generates an alternate-current (AC) voltage by transforming a voltage applied to the high-voltage power supply and a plurality of rectification units that are connected to the power transformation unit in order to rectify the AC voltage into different DC voltages, respectively.

35 Claims, 15 Drawing Sheets

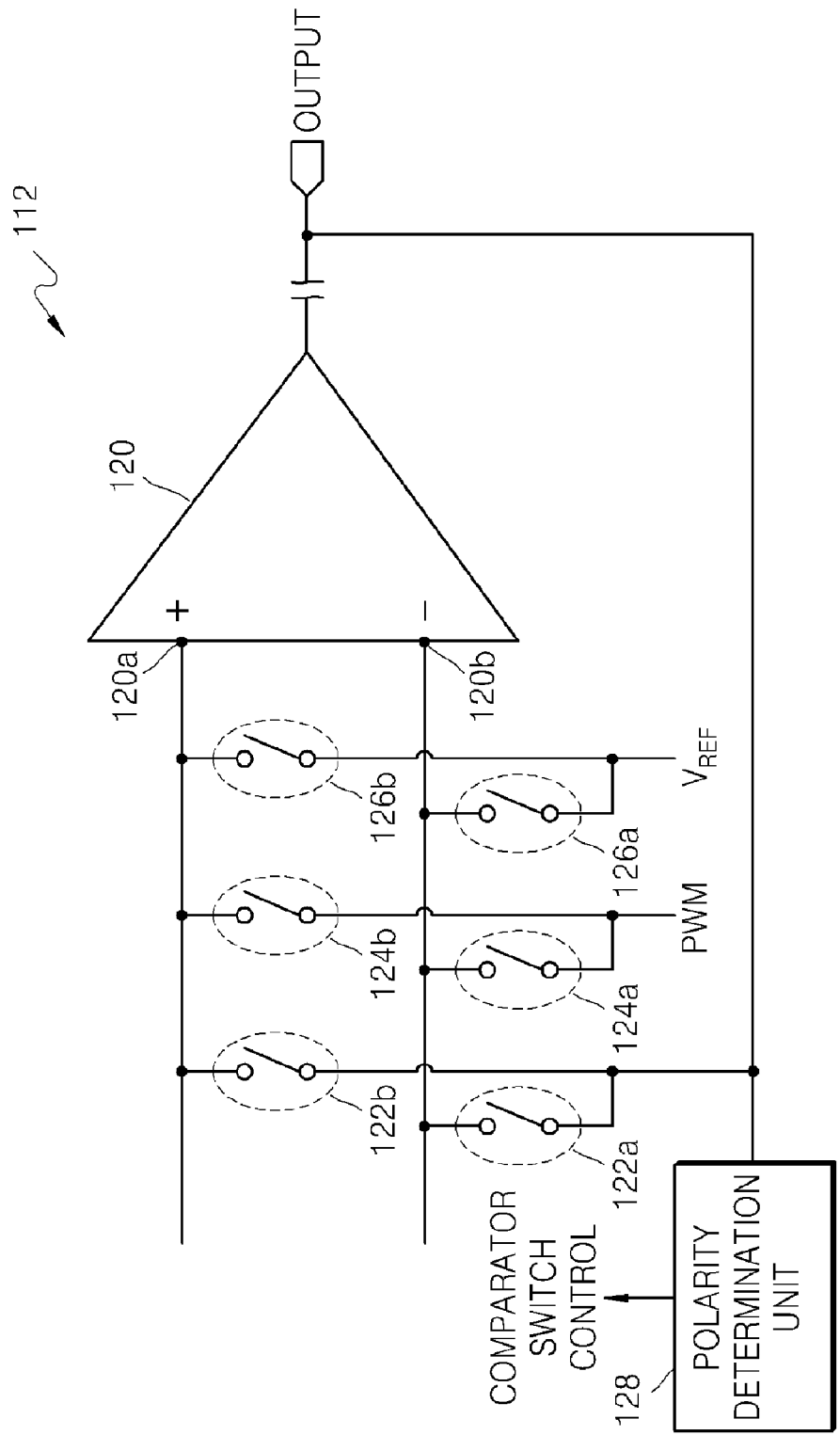

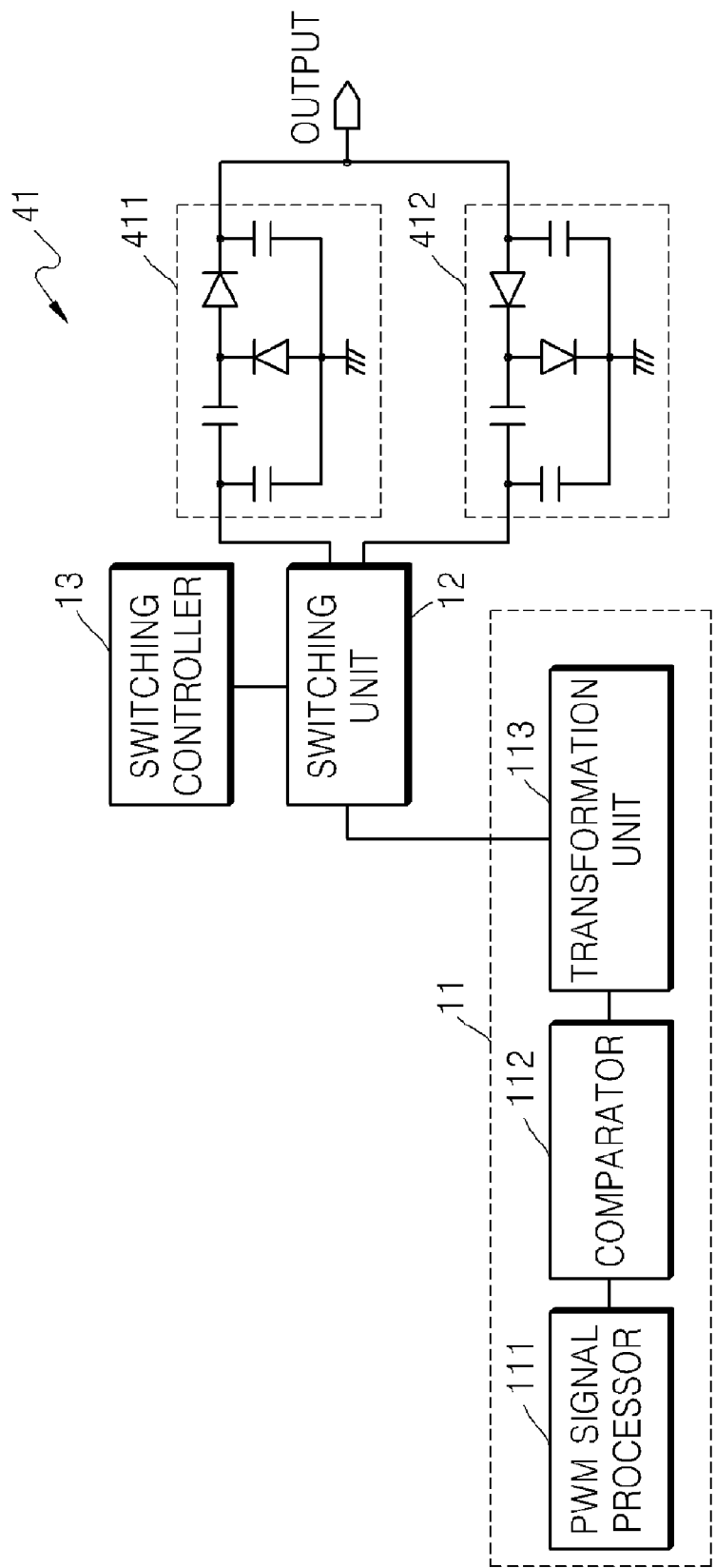

HIGH-VOLTAGE POWER SUPPLY OF IMAGE FORMING APPARATUS

CROSS-REFERENCE TO RELATED APPLICATIONS

This application claims the benefit of priority under 35 U.S.C. §119 of Korean Patent Application No. 10-2009-0084433, filed on Sep. 8, 2009, in the Korean Intellectual Property Office, the disclosure of which is incorporated herein in its entirety by reference.

BACKGROUND

1. Field of the Invention

The present general inventive concept relates to a power supply of an image forming apparatus, and more particularly, to a high-voltage power supply of an image forming apparatus that generates a high-voltage signal from a low-voltage signal.

2. Description of the Related Art

Image forming apparatuses, such as a laser beam printer (LBP), include a plurality of devices that operate using a high voltage. Examples of the plurality of devices are a charge roller (CR) that applies an electric potential to a surface of a photoconductive drum included in an image forming apparatus, a development roller (DR) that develops an electrostatic latent image formed on a surface of the photoconductive drum, and a transfer roller (TR) that transfers the electrostatic image onto a printing medium. The types of power employed in the plurality of devices may be different from one another but a high direct-current (DC) voltage of a predetermined level or more, e.g., a DC voltage of 1000 V, is used as a power source in all the plurality of devices. Thus, a high-voltage power supply (HVPS) that can generate high DC voltages from a household alternating-current (AC) voltage, e.g., 220 Vrms, needs to be installed in image forming apparatuses.

SUMMARY

The present general inventive concept provides a high-voltage power supply of an image forming apparatus, in which a plurality of rectification circuits that output a plurality of high direct-current (DC) voltages share a circuit that transforms an input alternating current (AC) voltage into a DC voltage, so that a total number of circuit devices can be minimized to simplify circuit construction.

Additional features and utilities of the present general inventive concept will be set forth in part in the description which follows and, in part, will be obvious from the description, or may be learned by practice of the general inventive concept.

However, the present general inventive concept is not limited thereto and may be embodied in many different forms and should not be construed as being limited to the embodiments set forth herein. The present general inventive concept would be apparent to those of ordinary skill in the art from the following description.

Features and/or utilities of the present general inventive concept may be realized by a high-voltage power supply usable in an image forming apparatus, the high-voltage power supply including a power transformation unit to generate an alternate-current (AC) voltage by transforming a voltage applied to the high-voltage power supply, a plurality of rectification units that are selectively connected to the power transformation unit to rectify the AC voltage into different direct-current (DC) voltages, respectively, and a switching unit to allow the power transformation unit to be connected to one of the plurality of rectification units.

Features and/or utilities of the present general inventive concept may also be realized by a high-voltage power supply including a power transformation unit to generate an alternate-current (AC) voltage by transforming a voltage applied to the high-voltage power supply, a plurality of rectification units that are selectively connected to the power transformation unit to rectify the AC voltage into different direct-current (DC) voltages, respectively, and a switching unit to allow the power transformation unit to be connected to one of the plurality of rectification units, wherein the switching unit allows the power transformation unit to be connected to one of the plurality of rectification units according to operational states of elements included in an image forming apparatus, to which one of the DC voltages generated is applied by the high-voltage power supply.

Features and/or utilities of the present general inventive concept may also be realized by a high-voltage power supply including a power transformation unit to receive a low-voltage power control signal and to output a high-voltage AC signal, a plurality of rectifier circuits connected in parallel with the power transformation unit to receive the high-voltage AC signal and to output a rectified high-voltage DC output signal, and a switching circuit to control output of the high-voltage AC signal to the plurality of rectifier circuits.

The power transformation unit may include a transformation unit to receive a low-voltage AC signal corresponding to a power input signal and to output a high-voltage AC signal corresponding to the power input signal.

The power transformation unit may include a comparator to receive a first input signal corresponding to the power input signal and a second input signal corresponding to a reference voltage signal and to output the low-voltage AC signal to the transformation unit based on a comparison result.

The power input signal may be a pulse-width modulation signal to control a power output of the high-voltage power supply, and the power transformation unit further may include a pulse-width modulation processor to filter the pulse-width modulation signal and to output the filtered pulse-width modulation signal as the first input signal to the comparator.

The comparator may receive as the first input signal the filtered pulse-width modulation signal and a feedback signal corresponding to the high-voltage DC outputs of the plurality of rectifier circuits.

The comparator may be an op-amp. The op-amp may include a first input having a first polarity and a second input having a second polarity opposite the first polarity, the reference voltage may input to the first input and the first input signal may input to the second input when a polarity of the rectified high-output DC signal is positive, and the reference voltage may be input to the second input and the first input signal may be input to the first input when a polarity of the rectified high-output DC signal is negative.

The switching circuit may include a single switching element having one switch input connected to the power transformation unit and having a plurality of switch outputs connected to each of the plurality of rectifier circuits, respectively, and the single switching element may connect a signal from the one switch input to one of the switch outputs.

The switching circuit may include a plurality of switching elements, each connected between a single switch input and a plurality of switch outputs corresponding to the plurality of rectifier circuits, respectively, and the switching circuit may connect a signal from the power transformation unit to one of the plurality of rectifier circuits by turning on a switching element corresponding to the one of the plurality of rectifier circuits and turning off the remaining switching elements.

The plurality of switching elements may be transistors.

The high-voltage power supply may further include a switching controller to generate at least one switching control signal to control the switching circuit.

The switching controller may independently generate a plurality of switching control signals to control a respective plurality of switching elements of the switching circuit.

The switching circuit may include two switching elements corresponding to two respective rectifier circuits, the switching controller may include an inverter, and the switching controller may generate a single switching control signal to control the two switching elements, such that the switching control signal is not inverted to control one of the switching elements and the switching control signal is inverted to control the other of the switching elements.

The switching circuit may be a relay circuit and the switching controller may include at least one transistor connected to the relay to output the high voltage AC signal to a first rectifier circuit of the plurality of rectifier circuits when the transistor is on and to output the high voltage AC signal to a second rectifier circuit of the plurality of rectifier circuits when the transistor is off.

At least one of the plurality of rectifier circuits may output a high-voltage DC output having a polarity that is different from a polarity of the high-voltage DC output of another of the rectifier circuits.

At least one of the plurality of rectifier circuits may output a high-voltage DC output having a voltage level that is different from a voltage level of the high-voltage DC output of another of the rectifier circuits.

At least two of the plurality of rectifier circuits may be connected to a same output terminal.

At least two of the plurality of rectifier circuits may be connected to separate output terminals.

Features and/or utilities of the present general inventive concept may also be realized by an image-forming device including a plurality of image-forming elements to receive high-voltage DC power, a high-voltage power supply to supply the high-voltage DC power to the plurality of image-forming elements, and a controller to supply the low-voltage power control signal to the power transformation unit to control operation of the high-voltage power supply to supply the high-voltage DC power to one or more of the plurality of image-forming elements.

The plurality of image-forming elements may include a photoconductive drum, a charging unit to charge the photoconductive drum, a laser unit to supply a laser to the charged photoconductive drum to form a latent image on the photoconductive drum, a transfer roller to transfer the latent image from the photoconductive drum to a recording medium, and a fuser to fuse an image corresponding to the latent image to the recording medium.

The controller may provide switching control signals to control the switching circuit of the high-voltage power supply to connect the power transformation unit to one of the plurality of rectifier circuits.

The plurality of rectifier circuits may be connected to a single output terminal, and the controller may control the image-forming elements to determine which of the image-forming elements uses the high-voltage DC power output from the high-voltage power supply.

BRIEF DESCRIPTION OF THE DRAWINGS

The above and other features and utilities of the present general inventive concept will become more apparent by describing in detail exemplary embodiments thereof with reference to the attached drawings in which:

FIGS. 1A-1C are block diagrams of a high-voltage power supply according to an embodiment of the present general inventive concept;

FIGS. 4A and 4B are block diagrams of high-voltage power supplies that include a plurality of rectification units, according to other embodiments of the present general inventive concept;

DETAILED DESCRIPTION OF THE EMBODIMENTS

Figure 1A:
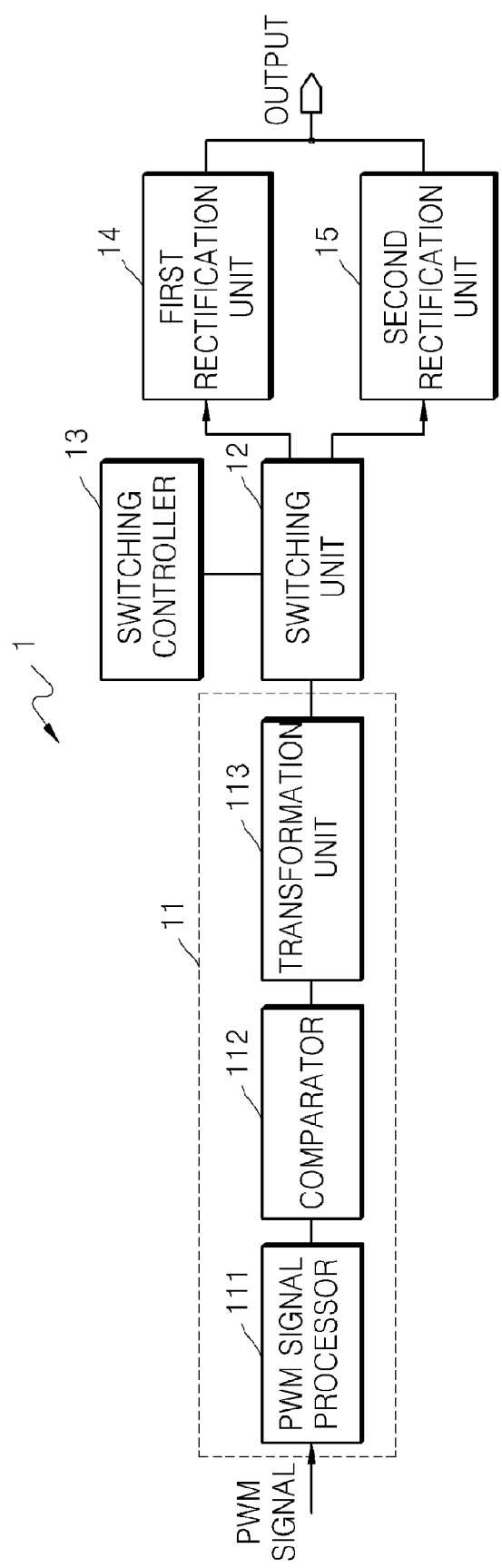

The present general inventive concept will now be described more fully with reference to the accompanying drawings, in which exemplary embodiments of the present general inventive concept are shown.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1A is a block diagram of a high-voltage power supply (HVPS) 1 according to an embodiment of the present general inventive concept. Referring to FIG. 1A, the high-voltage power supply 1 includes a power transformation unit 11, a switching unit 12, a switching controller 13, a first rectification unit 14, and a second rectification unit 15. The power transformation unit 11 includes a pulse width modulation (PWM) signal processor 111, a comparator 112, and a transformation unit 113. In the current embodiment, it would be obvious to those of ordinary skill in the art that the high-voltage power supply 1 may further include other general elements.

In an image forming apparatus having a printing function, e.g., a multi-functional device or a laser printer, a laser beam is irradiated onto a photoconductive drum in order to form an electrostatic latent image of characters or of an image to be printed on a piece of printing paper, toner is applied to the photoconductive drum, and then the electrostatic latent image is developed. Then, the developed electrostatic latent image is transferred and fused onto printing paper, and the printing paper printed with the characters or the image is output from the image forming apparatus. In order to perform such a printing function, the image forming apparatus requires high-voltage power to drive internal devices therein. In the image forming apparatus, the high-voltage power supply 1 is included in order to obtain high-voltage power output. In the high-voltage power supply 1, a circuit that generates a plurality of high voltages is formed on a substrate, and thus, a plurality of circuit devices is included in the circuit. In order to manufacture a high-voltage power supply having reduced cost and the same performance compared to other power supplies, the size of a substrate should be reduced by reducing the high-voltage power supply in size and a total number of circuit devices should be reduced in order to save manufacturing costs.

The high-voltage power supply 1 generates and outputs a high voltage to form an image in a transfer process. A central processing unit (CPU) of a main board of the image forming apparatus (not shown) transmits a pulse-width modulation PWM signal to the high-voltage power supply 1. Then, the high-voltage power supply 1 generates a high voltage from a DC voltage of 5 V or 24 V, for example. The DC voltage is applied to the high-voltage power supply 1 from a switching mode power supply device (not shown), and then the high-voltage power supply 1 applies the high voltage to elements included in the image forming apparatus according to the PWM signal. For example, when a user supplies a 'print' command to the image forming apparatus, the CPU supplies the PWM signal to the high-voltage power supply 1 so that the high-voltage power supply 1 may generate and output a high voltage. That is, when the 'print' command is given from the user, the high-voltage power supply 1 is driven to generate a high voltage according to the PWM signal. Then, the high-voltage power supply 1 transforms an input voltage, e.g., a 24 V input, into a high voltage of several hundreds or thousands of volts, for example, and then the high-voltage power supply 1 outputs the high voltage.

Elements of the high-voltage power supply 1 will now be described in detail.

When a DC voltage is applied to the power transformation unit 11 of the high-voltage power supply 1, the power transformation unit 11 transforms the DC voltage into an AC voltage. That is, when the PWM signal is input to the high-voltage power supply 1, a first transformer (not shown) included in the transformation unit 113 of the power transformation unit 11 oscillates the DC voltage, transforms it into an AC voltage, a second transformer (not shown) included in the transformation unit 113 of the power transformation unit 11 transforms the AC voltage into a high AC voltage, and outputs the high AC voltage. Selectively, the first and second rectification units 14 or 15 of the high-voltage power supply 1 may rectify the high AC voltage, which is received from the second transformer, and output a high DC voltage. The high DC voltages output from the first and second rectification units 14 and 15 are output from the high-voltage power supply 1 and are then applied to elements included in the image forming apparatus.

The power transformation unit 11 filters a received PWM signal, compares the received PWM signal with a reference voltage, transforms an AC voltage applied to the power transformation unit 11 into a high AC voltage according to a result of the comparison, and then outputs the high AC voltage. Elements of the power transformation unit 11 will be described in detail.

As described above, when a user gives a 'print' command, the PWM signal processor 111 receives the PWM signal from the CPU of the main board. The PWM signal is generated having pulse widths modulated to indicate the intensity of the signal. The PWM signal processor 111 receives a PWM signal from the CPU of the main board of the image forming apparatus and filters the PWM signal, and the PWM signal processor 111 filters the PWM signal using a low pass filter (LPF).

The PWM signal processor 111 uses the low-pass filter to filter the PWM signal so that the PWM signal may be compared with the reference voltage. The PWM signal processor 111 supplies the filtered PWM signal to the comparator 112.

The comparator 112 compares the PWM signal filtered by the PWM signal processor 111 with the reference voltage. If the result of comparison reveals that the filtered PWM signal is greater than the reference voltage, then a switching device included in the transformation unit 113 is switched on. If the result of comparison reveals that the filtered PWM signal is less than the reference voltage, then the switching device is switched off. That is, the comparator 112 outputs a driving control signal to control driving of the switching device. The switching device may be a semiconductor switch. Because the switching device is switched on and off, an input voltage, e.g., 24 V, is oscillated and transformed into an AC voltage, and then is applied to the second transformer of the transformation unit 113 to transform the AC voltage into a high AC voltage.

The comparator 112 may be an operational amplifier (OP-AMP). Here, the driving control signal may be a differential signal between the reference voltage and the filtered PWM signal from the PWM signal processor 111 but the present general inventive concept is not limited thereto. For example, the driving control signal may be a higher voltage from among the reference voltage and the filtered PWM signal from the PWM signal processor 111.

Figure 1B:
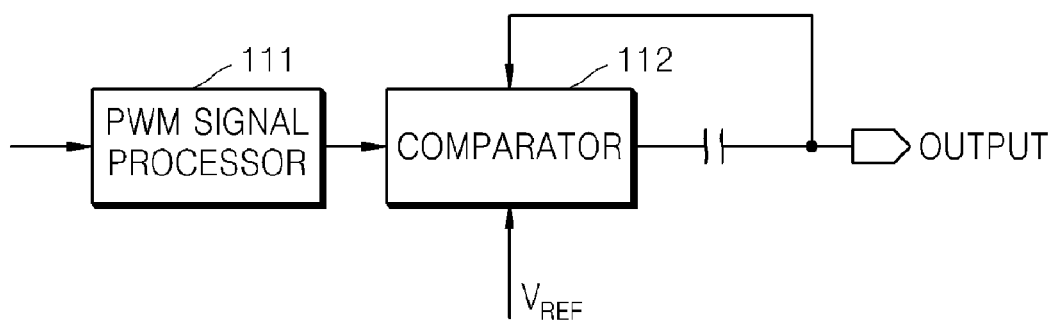

As illustrated in FIGS. 1B and 1C, the comparator 112 may receive outputs of the first and second rectification units 14 and 15 as feedback. In this case, the comparator 112 receives a DC voltage from the first rectification unit 14 or the second rectification unit 15 as feedback and compares the DC voltage with the reference voltage Vref. In the current embodiment, an output terminal of the first rectification unit 14 and an output terminal of the second rectification unit 15 may either be respectively connected to external devices or may be combined and connected to external devices. As illustrated in FIG. 1C, if the comparator 112 includes an OP-AMP 120, the comparator 112 has a non-inverting input terminal 120*a* and an inverting input terminal 120*b* as input terminals.

According to an embodiment of the present general inventive concept, if outputs of the first and second rectification units 14 and 15 are transmitted via a single output terminal, then the output terminal is connected to either the non-inverting input terminal or the inverting input terminal of the comparator 112 according to the polarity of a high DC voltage output from the output terminal in order to receive feedback regarding the high DC voltage.

According to another embodiment of the present general inventive concept, if outputs of the first and second rectification units 14 and 15 are transmitted via output terminals respectively thereof, then the output terminals of the first and second rectification units 14 and 15 are connected to either the non-inverting input terminal or the inverting input terminal of the comparator 112 according to the polarity of a high DC voltage output from one of the output terminals in order to receive feedback regarding the high DC voltage. That is, whether each of the filtered PWM signal, a high DC voltage output from the first rectification unit 14 or the second rectification unit 15, and the reference voltage is applied to the non-inverting input terminal or the inverting input terminal of the comparator 112 is determined by the polarity of the high DC voltage.

FIG. 1C illustrates a comparator 112 that receives as feedback an output from a single output terminal, similar to FIG. 1A. The output is connected to a polarity determination unit 128, which determines the polarity of the output and controls the switches 122a, 122b, 124a, 124b, 126a, and 126b of the comparator 112 accordingly. For example, if the polarity determination unit 128 determines that the output has a positive polarity, switches 122b, 124b, and 126a may be closed so that the output signal and the PWM signal are input to the non-inverted terminal 120a and the voltage reference signal 120b is input to the inverting terminal 120b. On the other hand, if the polarity determination unit 128 determines that the polarity of the output is negative, it may close switches 122a, 124a, and 126b, and open the remaining switches, so that the output voltage and the PWM signal are input to the inverted terminal 120b and the voltage reference signal Vref is input to the non-inverted terminal 120a.

The polarity determination unit 128 may be part of the comparator or part of a controller external to the comparator.

In detail, when the high DC voltage has a negative (−) polarity, the filtered PWM signal and the high DC voltage are applied to the non-inverting input terminal of the comparator 112 and the reference voltage is applied to the inverting input terminal of the comparator 112. However, when the high DC voltage has a positive (+) polarity, the filtered PWM signal and the high DC voltage are applied to the inverting input terminal of the comparator 112 and the reference voltage is applied to the non-inverting input terminal of the comparator 112. Accordingly, whether each of the first and second rectification units 14 and 15 is to be connected to the non-inversion terminal and the inversion terminal of the comparator 112 is determined by the polarity of the high DC voltage.

The transformation unit 113 transforms an input voltage applied thereto by the switching mode power supply device (not shown) into a high AC voltage according to the result of comparison of the comparator 112. Although not shown, the transformation unit 113 includes the switching device, e.g., a switching transistor, and the transformer that transforms the DC voltage into the high AC voltage. The switching device is switched on or off according to the result of comparison of the comparator 112, thereby controlling a transformation process of the transformer. If the result of comparison is that the PWM signal filtered by the PWM signal processor 111 is greater than the reference voltage, the switching device is switched on. If the result of comparison is that the filtered PWM signal is less than the reference voltage, the switching device is switched off. By switching the switching device on or off, an input DC voltage of 24 V applied from the switching mode power supply device is oscillated and transformed into an AC voltage and is then applied to the second transformer of the transformation unit 113. The applied AC voltage is transformed into a high AC voltage according to a ratio of turns voltage is generated in the second coil of the transformer and then output therefrom. Thus, the transformation unit 113 may output the high AC voltage. The high AC voltage is applied to the first or second rectification unit 14 or 15. Whether the high AC voltage is applied to the first or second rectification unit 14 or 15 is determined by a switching operation of the switching unit 12.

The switching unit 12 connects the power transformation unit 11 to the first or second rectification unit 14 or 15, in response to a control signal output from the switching controller 13. In detail, the switching unit 12 connects the power transformation unit 11 to the first or second rectification unit 14 or 15, according to the control signal, which indicates a corresponding element is to be applied a DC voltage generated by the high-voltage power supply 1, from among the elements included in the image forming apparatus. The elements of the image forming apparatus are devices connected to the high-voltage power supply 1. That is, the elements of the image forming apparatus refer to the elements other than the high-voltage power supply 1 included in the image forming apparatus. Here, the control signal is supplied from the switching controller 13 to control the switching operation of the switching unit 12.

The switching unit 12 may be constructed in various ways according to the type of switching device that constitutes the switching unit 12. The switching device may be manufactured using at least one selected from the group consisting of a relay, a photo coupler, a bipolar junction transistor (BJT), and a field effect transistor (FET).

According to the current embodiment, the switching unit 12 is a single switching device, one terminal of which is connected to an output terminal of the transformation unit 113 and the other terminal of which is connected to the first or second rectification unit 14 or 15 according to the control signal. That is, the switching device does not perform an 'on/off' operation repeatedly but connects a target device to a terminal from among a plurality of terminals according to a control signal. For example, when the switching device connects the transformation unit 113 to the first rectification unit 14 according to the control signal, the high AC voltage output from the transformation unit 113 is rectified by the first rectification unit 14.

According to another embodiment of the present general inventive concept, the switching unit 12 may include a plurality of switching devices that are switched on or off according to the control signal. In this case, the switching controller 13 controls the plurality of switching devices. Thus, the switching unit 12 connects the transformation unit 113 to the first or second rectification unit 14 or 15. That is, the plurality of switching devices are connected to input terminals of the first and second rectification units 14 and 15, respectively, and the switching controller 13 controls the plurality of switching devices to be switched on/off at different times so that only one of the plurality of switching devices may be switched on. For example, if the switching device connected to the first rectification unit 14 is switched on according to the control signal, then the transformation unit 113 is connected to the first rectification unit 14 and the high AC voltage output from the transformation unit 113 is rectified by the first rectification unit 14.

According to another embodiment of the present general inventive concept, the switching unit 12 may be a combination of such switching devices mentioned in the above embodiments. That is, a switching device connected to the first or second rectification unit 14 or 15 has one terminal connected to the output terminal of the transformation unit 113 and another terminal connected to the input terminal of the other rectification unit, and a switching device connected to the other rectification unit is switched on or off according to the control signal.

Figure 2A:
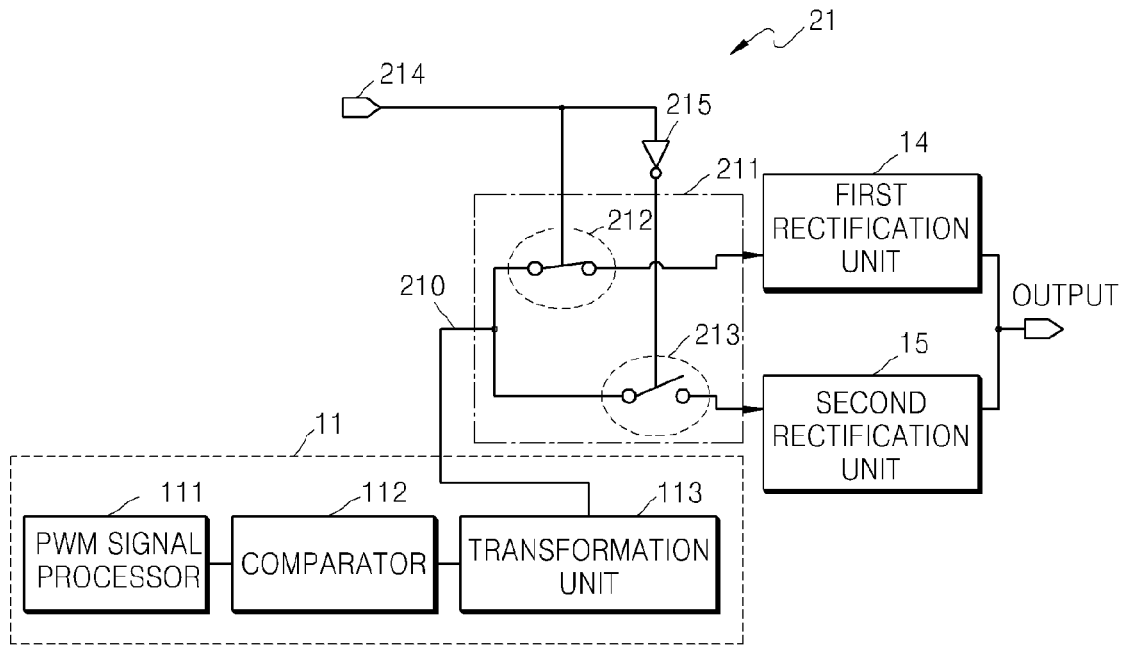
FIGS. 2A through 2D are block diagrams of high-voltage power supplies that include a switching unit according to other embodiments of the present general inventive concept.
Figure 2B:
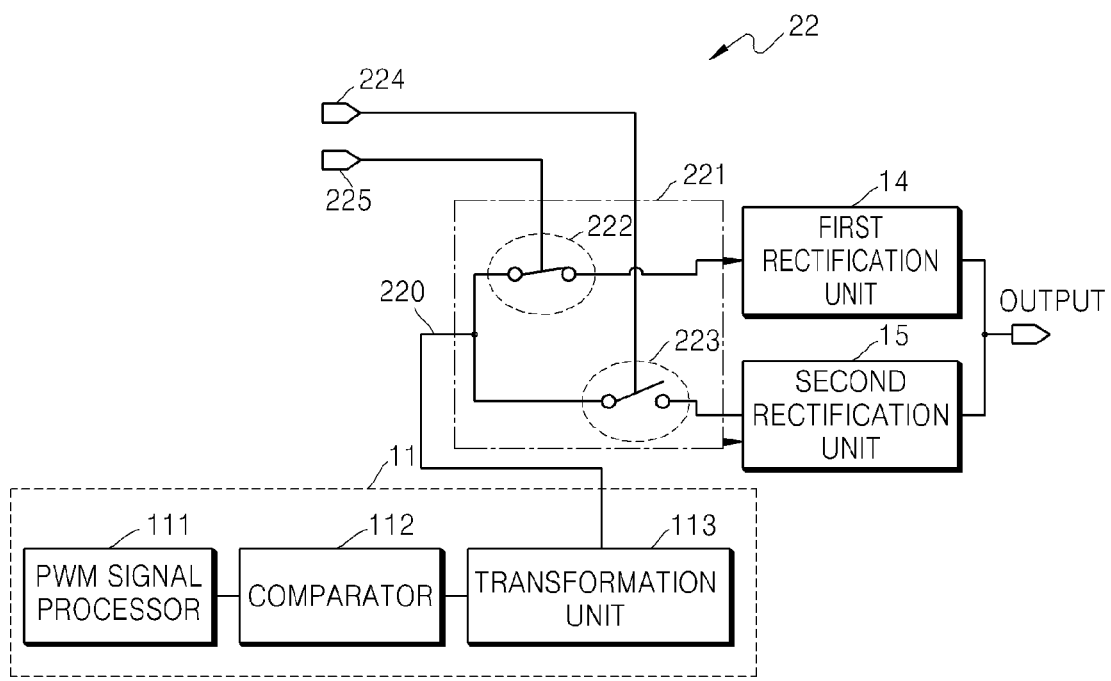

FIG. 2A is a circuit diagram of a high-voltage power supply 21 that includes a switching unit 211 according to another embodiment of the present general inventive concept. FIG. 2B is a circuit diagram of a high-voltage power supply 22 that includes a switching unit 221 according to another embodiment of the present general inventive concept. The switching unit 211 includes a plurality of switching devices 212 and 213 that are switched on or off according to a control signal 214. The switching unit 221 includes a plurality of switching devices 222 and 223 that are switched on or off according to control signals 224 and 225, respectively. In FIGS. 2A and 2B, a power transformation unit 11 that includes a PWM signal processor 111, a comparator 112, and a transformation unit 113, a first rectification unit 14, a second rectification unit 15 are the same as those illustrated in FIG. 1.

Referring to FIG. 2A, in the high-voltage power supply 21, the switching unit 211 includes the switching devices 212 and 213. One terminal of the switching device 212 is connected to an output terminal 210 of the transformation unit 113 and another terminal thereof is connected to the first rectification unit 14. Similarly, one terminal of the switching device 213 is connected to the output terminal 210 of the transformation unit 113 and the other terminal thereof is connected to the second rectification unit 15. The control signal 214 is transmitted to both the switching devices 212 and 213. If the switching devices 212 and 213 are switched on when the control signal 214 is a high signal and are switched off when the control signal 214 is a low signal, then the switching device 212 may be switched on to connect the output terminal 210 of the transformation unit 113 to the first rectification unit 14 when the control signal 214 is a high signal. In this case, since the switching device 213 is connected to an inverter 215, the control signal 214 that is a low signal is transmitted to the switching device 213. Thus, the switching device 213 is switched off, and the output terminal 210 of the transformation unit 113 may not be connected to the second rectification unit 15. Accordingly, a high AC voltage output from the transformation unit 113 is rectified by the first rectification unit 14.

Referring to FIG. 2B, in the high-voltage power supply 22, the switching unit 221 includes the switching devices 222 and 223. One terminal of the switching device 222 is connected to an output terminal 220 of the transformation unit 113 and another terminal thereof is connected to the first rectification unit 14. Similarly, one terminal of the switching device 223 is connected to the output terminal 220 of the transformation unit 113 and another terminal thereof is connected to the second rectification unit 15. The first control signal 224 is transmitted to the switching device 222 and the second control signal 225 is transmitted to the switching device 223. If the switching devices 222 and 223 are switched on when the control signals 224 and 225 are high and are switched off when the control signals 224 and 225 are low, respectively, then the switching device 222 is switched on to connect the output terminal 220 of the transformation unit 113 to the first rectification unit when the first control signal 224 is a high signal. However, accordingly, the second control signal 225 is a low signal and thus switches off the switching device 213, so that a high AC voltage output from the transformation unit 113 can be rectified by only the first rectification unit 14. Accordingly, the high AC voltage output from the transformation unit 113 is rectified by the first rectification unit 14.

Figure 2C:
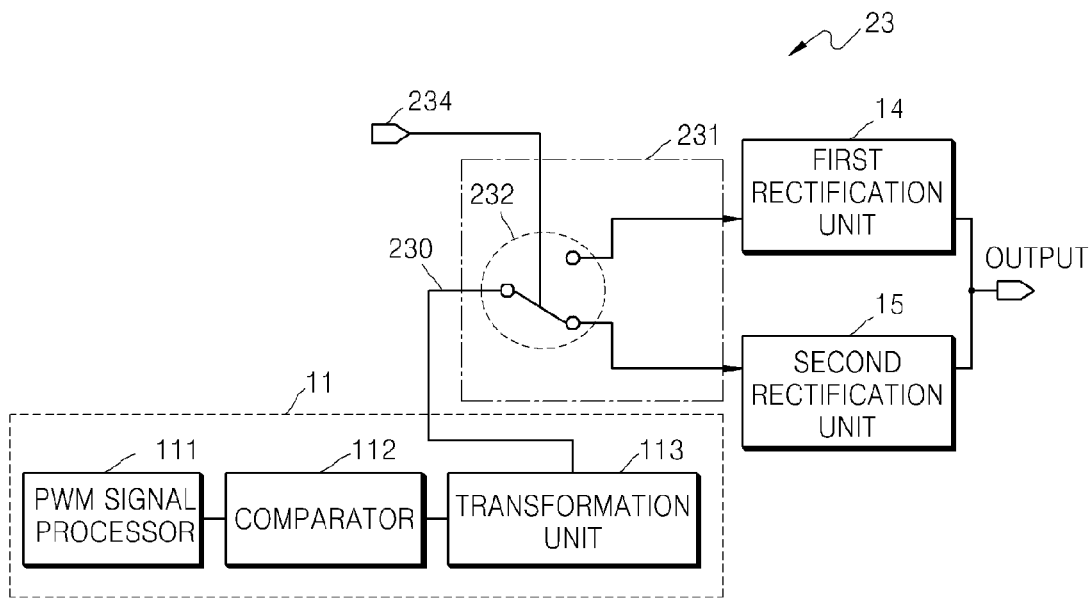

FIG. 2C illustrates a high-voltage power supply 23 similar to that of FIG. 2A, except the switching circuit 231 includes a single switching element 232 connected to multiple rectification units 14 and 15. The power transformation unit 11 is similar to that of FIG. 2A. An output terminal 230 connects to the switching circuit 231. The switching circuit 231 includes one switching element 232 having a single input connected to the output terminal 230 of the power transformation unit 11. However, the switching element 232 has multiple outputs connected to respective rectification units 14 and 15, and the switching control signal 234 controls the switching element 232 to determine which rectification unit 14 or 15 will be connected to the output terminal 230 of the power transformation unit 11.

Figure 2D:
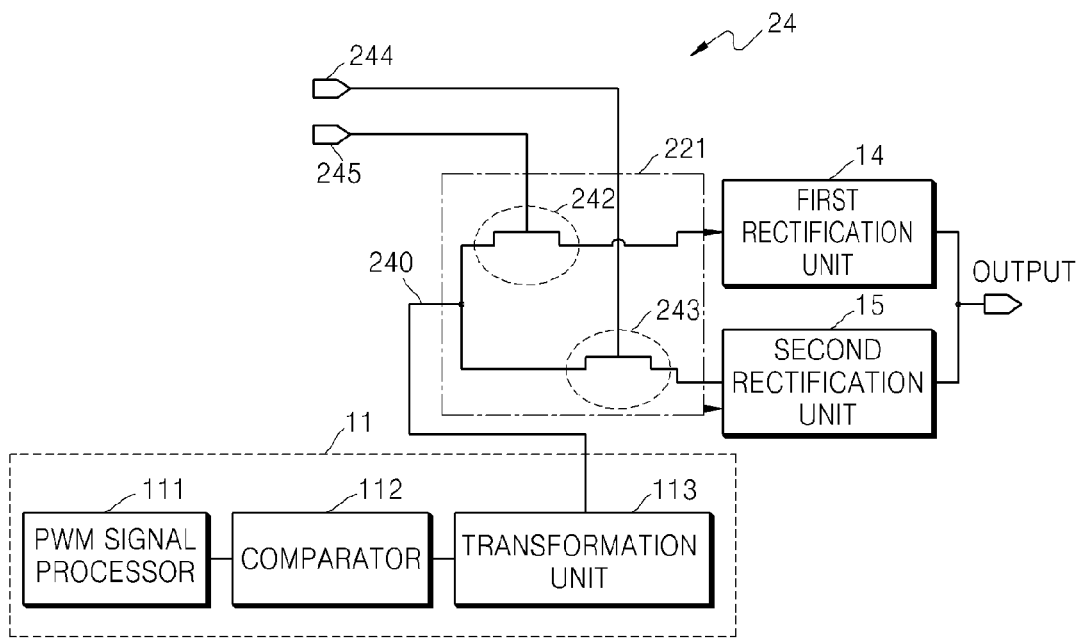

FIG. 2D illustrates a high-voltage power supply 24 similar to FIG. 2B. However, in FIG. 2D, the switching elements 242 and 243 are transistors. The switching control signals 244 and 245 are connected to the gates of the transistors and may turn on and off the transistors to connect the rectification units 14 and 15 to the output terminal 240 of the power transformation unit 11.

Figure 3:
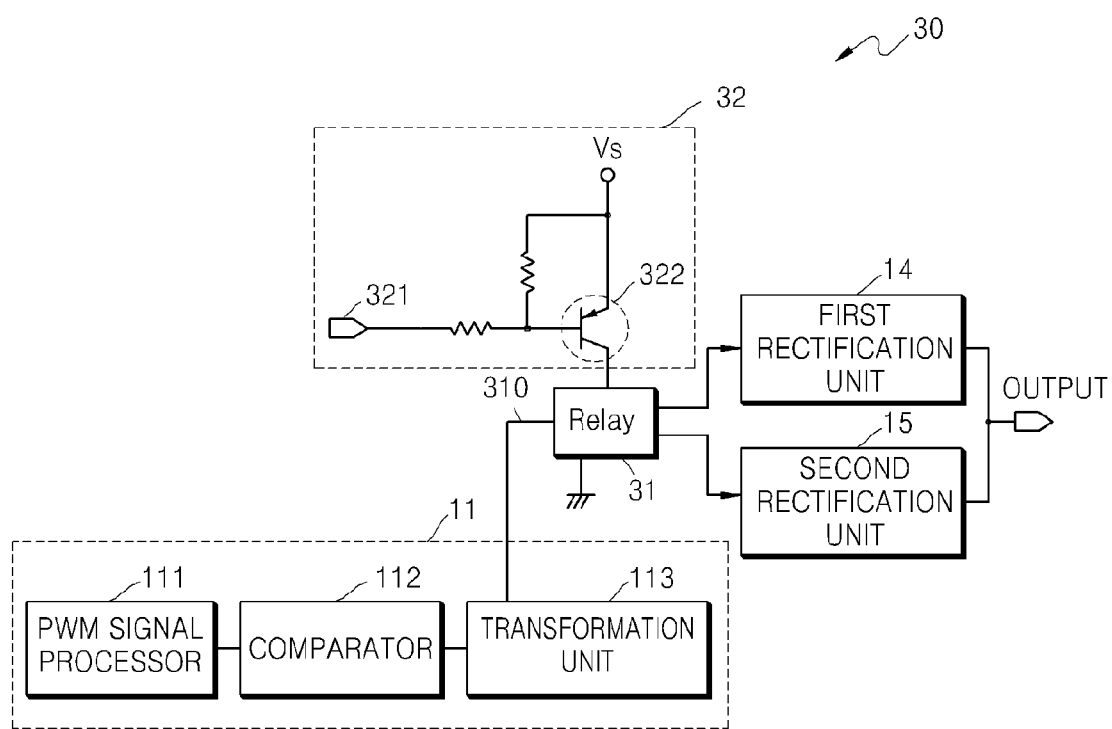
FIG. 3 is a block diagram of a high-voltage power supply that includes a switching unit and a switching controller according to another embodiment of the present general inventive concept.

FIG. 3 is a circuit diagram of a high-voltage power supply 30 that includes a switch unit 31 and a switching controller 32 according to another embodiment of the present general inventive concept. Referring to FIG. 3, the switch unit 31 is embodied as a relay, and the switching controller 32 operates the relay 31 by supplying a control signal 321 to a pnp type bipolar junction transistor (BJT) 322. The relay 31 is connected to an output terminal 310 of a transformation unit 113, an input terminal of a first rectification unit 14, and an input terminal of a second rectification unit 15. In FIG. 3, a power transformation unit 11 that includes a PWM signal processor 111, a comparator 112, the transformation unit 113, and the first rectification unit 14 and the second rectification unit 15 are the same as those illustrated in FIG. 1.

More specifically, when the control signal 321 that is a low signal is supplied to a base of the BJT 322, the relay 31 connected to a collector of the BJT 322 is enabled by a voltage Vs applied to an emitter of the BJT 322. When the relay 31 is enabled, a switching operation is performed in the relay 31 and the output terminal 310 of the transformation unit 113 is thus connected to the input terminal of the first rectification unit 14. However when the control signal 321 that is a high signal is supplied to the base of the BJT 322, the voltage Vs is not applied to the relay 31 connected to the collector of the BJT 322 and the relay 31 is thus not enabled. Thus, the switching operation is performed in the relay 31 and the output terminal 310 of the transformation unit 113 is thus connected to the input terminal of the second rectification unit 15. Thus, it is possible to control the output terminal 310 of the transformation unit 113 to be connected to the first or second rectification unit 14 or 15 by controlling the switching operation in the relay 31 according to the logic level of the control signal 321.

Referring back to FIG. 1, the switching controller 13 transmits the control signal to control the switching operation to the switching unit 12. In general, a PWM signal is used as the control signal. As described above, the control signal indicates an element that is to be applied a DC voltage generated by the high-voltage power supply 1 from among the elements of the image forming apparatus. The elements of the image forming apparatus are devices connected to the high-voltage power supply 1. That is, the elements of the image forming apparatus refer to devices other than the high-voltage power supply 1 included in the image forming apparatus. If the image forming apparatus is a printer, the control signal may indicate whether the DC voltage is to be applied to a device, for example, from among a charge roller, a development roller, and a transfer roller that are included in the printer. That is, the control signal contains information that indicates whether the transfer roller, the development roller, or the charge roller will operate.

When the switching unit 12 includes one switching device, one control signal is transmitted to the switching device but when the switching unit includes a plurality of switching devices, at least one control signal is transmitted to each of the switching devices, respectively. Here, the PWM signal is used to control the switching device of the switching unit 12 and thus has pulse widths that are different from that of the PWM signal to be filtered by the PWM signal processor 111 of the high-voltage power supply 1 of FIG. 1. The switching controller 13 controls the switching unit 12 by using the PWM signal that is generated according to, for example, a CPU of a main board of an image forming apparatus. That is, the pulse widths of the PWM signal are controlled by the CPU according to ambient conditions or functions to be performed by the image-forming apparatus that includes the high-voltage power supply 1.

The first rectification unit 14 and the second rectification unit 15 are alternately connected to the transformation unit 113 according to the switching operation of the switching unit 12, so that they may output different high DC voltages by rectifying a high AC voltage output from the transformation unit 113 in different ways, respectively. The first and second rectification units 14 and 15 are connected to the transformation unit 113 at different times, according to the switching operation of the switching unit 12. That is, the switching controller 13 transmits the control signal to the switching unit 12 to connect the first or second rectification unit 14 or 15 to the transformation unit 113. Accordingly, the high-voltage power supply 1 outputs a high DC voltage from the first or second rectification unit 14 or 15 connected to the transformation unit 113 according to the switching operation of the switching unit 12. In the current embodiment, two rectification units, i.e., the first and second rectifications 14 and 15, are described for convenience of explanation, but the present general inventive concept is not limited thereto and the high-voltage power supply 1 may include more than two rectification units.

Since the transformation unit 113 is connected to only the first or second rectification unit 14 or 15 at any time according to the switching operation of the switching unit 12, the number of the power transformation unit 11 may not be the same as the total number of rectification units. That is, only one power transformation unit 11 may correspond to a plurality of rectification units, and thus, the total number of elements needed for circuit construction may be reduced, thereby reducing the size of the high-voltage power supply 1 and simplifying the circuit construction thereof.

Each of the first and second rectification units 14 and 15 rectifies a high AC voltage received from the transformation unit 113 into a high DC voltage by adjusting the multiplication rate and polarity of the high DC voltage. The first and second rectification units 14 and 15 are rectification circuits where each may be formed of a diode, a capacitor, and so on. Thus, the multiplication rate and polarity of the high DC voltage may be controlled according to diodes and capacitors that constitute a rectification circuit. There are various types of rectification circuit, and descriptions thereof would be obvious to those of ordinary skill in the art and therefore will not be provided here.

In an image forming apparatus, such as a laser printer, electrophotography may be employed, in which an electrostatic latent image is formed by irradiating a laser beam onto an Organized Photo Conductor (OPC) drum according to an image signal. The image is developed by attaching toner to the OPC drum, transferring the toner from the OPC drum onto paper, and then fusing the toner with the paper. Printers generally include one or more devices such as the OPC drum, a charge roller, a development roller, a supply roller (SR), and a transfer roller.

To perform printing in the printer, first, the charge roller charges a surface of the OPC drum to have a '−' (negative) voltage. Next, an electrostatic latent image is formed by irradiating a laser beam onto a part of the surface of the OPC drum having the '−' polarity. In this case, the part of the surface of the OPC drum irradiated by the laser beam assumes '+' (positive) polarity unlike remaining surface parts of the OPC drum. Then, when toner having '−' polarity is applied onto the OPC drum by using the development roller, the toner having '−' polarity is attached to the electrostatic latent image having '+' polarity. The electrostatic latent image attached with the toner is transferred onto paper from the OPC drum when the paper passes against the OPC drum. The transfer roller assumes '+' polarity in order to transfer the toner having '−' polarity onto the paper when the paper passes against the OPC drum but assumes '−' polarity in order to clean remnant toner after the paper has passed against the OPC drum.

As described above, the devices, such as the OPC drum, the charge roller, the development roller, the supply roller, and the transfer roller, which are included in the printer, assume '+' or '−' polarity in order to perform printing. To this end, these elements should be applied a '−' or '+' high voltage by the high-voltage power supply. That is, a '−' high voltage is applied to the charge roller, the development roller, and the supply roller, and a '+' or '−' high voltage is applied to the transfer roller. Thus, the first and second rectification units 14 and 15 are designed to rectify a high AC voltage into a '+' or '−' high DC voltage according to the polarity of a high voltage to be applied to each of the elements of the image forming apparatus. The high-voltage power supply 1 of FIG. 1 may be embodied in various ways, according to the multiplication rate and polarity of a high DC voltage output from the first or second rectification unit 14 or 15. First, embodiments of the high-voltage power supply 1 according to the present general inventive concept will now be described with respect to the polarity of a high DC voltage output According to one embodiment of the present general inventive concept, the high-voltage power supply 1 includes the first and second rectification units 14 and 15 that may rectify a high AC voltage received from the transformation unit 113 into high DC voltages, the polarities of which are opposite to each other, respectively. For example, the first rectification unit 14 may rectify the high AC voltage into a '+' high DC voltage but the second rectification unit 15 may rectify the high AC voltage into a '−' high DC voltage. That is, the first and second rectification units 14 and 15 are constructed to respectively rectify a high AC voltage into high DC voltages having opposite polarities by controlling the polarity of the high AC voltage according to a user environment.

According to one embodiment of the present general inventive concept, the high-voltage power supply 1 includes the first and second rectification units 14 and 15 that may rectify a high AC voltage received from the transformation unit 113 into high DC voltages, the polarities of which are the same, respectively. For example, the first rectification unit 14 and the second rectification unit 15 rectify the high AC voltage into a '+' or '−' high DC voltage. That is, the first and second rectification units 14 and 15 are constructed to respectively rectify a high AC voltage into '+' or '−' high DC voltages by controlling the polarity of the high AC voltage according to a user environment.

Next, embodiments of the high-voltage power supply 1 that may change the multiplication rate of a high DC voltage output, according to the present general inventive concept, will now be described.

According to another embodiment of the present general inventive concept, the high-voltage power supply 1 includes the first and second rectification units 14 and 15 that may rectify a high AC voltage received from the transformation unit 113 into different high DC voltages by controlling a multiplication rate of the high AC voltage respectively. For example, the first rectification unit 14 may rectify the high AC voltage by multiplying the high AC voltage by '1' but the second rectification unit 15 may rectify the high AC voltage by multiplying the high AC voltage by '2'. That is, the first and second rectification units 14 and 15 may be constructed to respectively rectify a high AC voltage into different high DC voltages by multiplying the high AC voltage according to a user environment.

According to another embodiment of the present general inventive concept, the high-voltage power supply 1 includes the first and second rectification units 14 and 15 that may rectify a high AC voltage received from the transformation unit 113 into the same high DC voltage by multiplying the high AC voltage by the same factor. For example, both the first rectification unit 14 and the second rectification unit 15 may rectify the high AC voltage by multiplying the high AC voltage by '1'. That is, the first and second rectification units 14 and 15 may be constructed to rectify a high AC voltage by multiplying it by the same factor according to a user environment.

According to another embodiment of the present general inventive concept, the high-voltage power supply 1 includes the first and second rectification units 14 and 15 that may rectify a high AC voltage received from the transformation unit 113 into high DC voltages whose polarities are opposite to each other and that are multiplied by different factors, respectively. For example, the first rectification unit 14 may rectify the high AC voltage into a '+' high DC voltage by multiplying the high AC voltage by '1', and the second rectification unit 15 may rectify the high AC voltage into a '−' high DC voltage by multiplying the high AC voltage by '2'. That is, the first and second rectification units 14 and 15 may be constructed to rectify a high AC voltage into different high different DC voltages by controlling the polarity and multiplication rate of the high AC voltage according to a user environment.

Figure 4B:
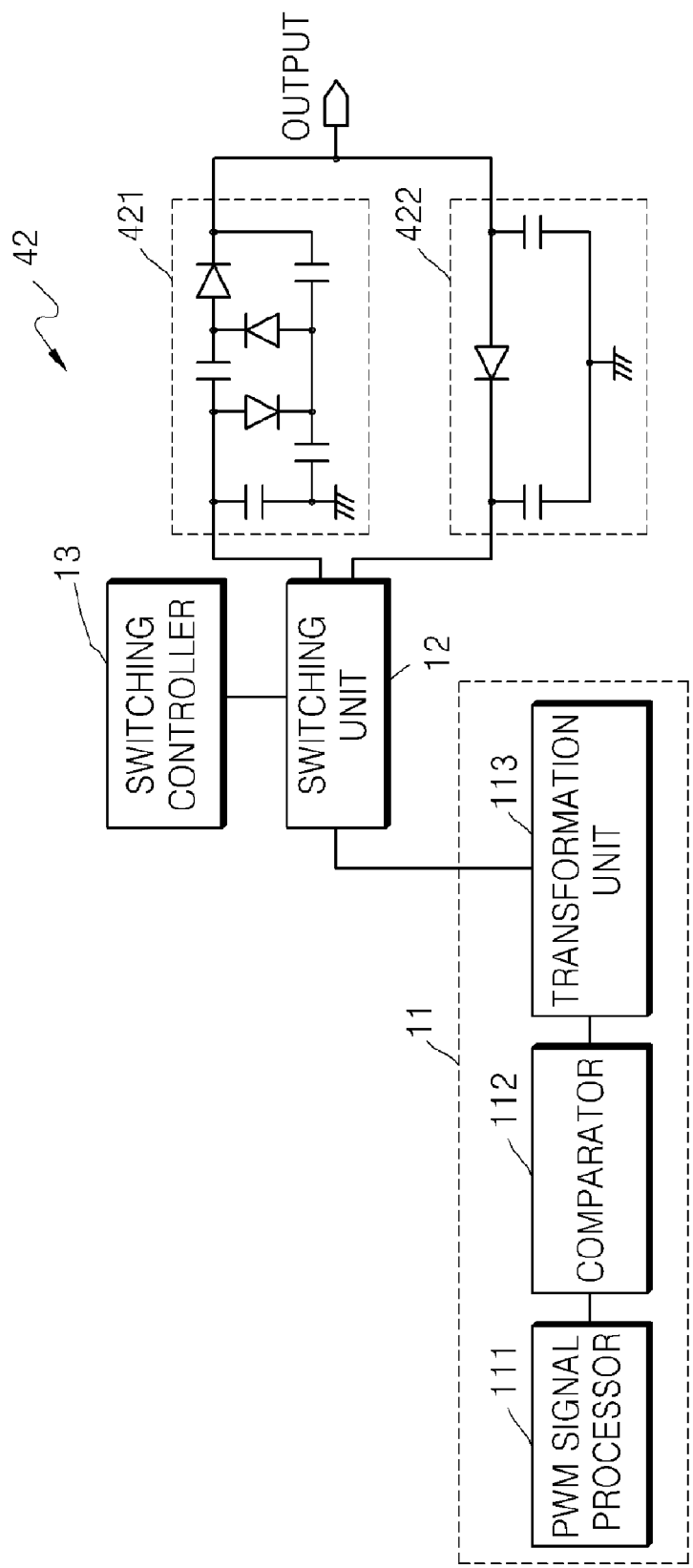

FIG. 4A is a block diagram of a high-voltage power supply 41 that includes first and second rectification units 411 and 412 according to another embodiment of the present general inventive concept. FIG. 4B is a block diagram of a high-voltage power supply 42 that includes first and second rectification units 421 and 422 according to another embodiment of the present general inventive concept. Referring to FIG. 4A, in the high-voltage power supply 41, a high AC voltage output from a transformation unit 113 is rectified into a plurality of high DC voltages, the polarities of which are different from each other and the multiplication rates of which are the same. Referring to FIG. 4B, in the high-voltage power supply 42, a high AC voltage output from a transformation unit 113 is rectified into a plurality of high DC voltages, the polarities and multiplication rates of which are different from each other. In FIGS. 4A and 4B, a power transformation unit 11 that includes a PWM signal processor 111, a comparator 112, and the transformation unit 113, a switching unit 12, and a switching controller 13 are the same as those illustrate in FIG. 1.

In the high-voltage power supply 41, the switching unit 12 is connected to the first rectification unit 411 and the second rectification unit 412. When the transformation unit 113 is connected to the first rectification unit 411 according to a switching operation of the switching unit 12, the first rectification unit 411 rectifies a high AC voltage received from the transformation unit 113 into a '+' high DC voltage. However, when the transformation unit 113 is connected to the second rectification unit 412 according to the switching operation of the switching unit 12, the second rectification unit 412 rectifies the high AC voltage received from the transformation unit 113 into a '−' high DC voltage. That is, the polarity of the DC voltage output from each of the first and second rectification units 411 and 412 depends on the direction in which a diode is arranged in each of the first and second rectification units 411 and 412.

In the high-voltage power supply 42, the switching unit 12 is connected to the first rectification unit 421 and the second rectification unit 422. When the transformation unit 113 is connected to the first rectification unit 421 according to a switching operation of the switching unit 12, the first rectification unit 421 rectifies a high AC voltage received from the transformation unit 113 into a high DC voltage by multiplying the high AC voltage by '2'. However, when the transformation unit 113 is connected to the second rectification unit 422 according to the switching operation of the switching unit 12, the second rectification unit 422 rectifies the high AC voltage received from the transformation unit 113 into a high DC voltage by multiplying the high AC voltage by '1'. That is, the multiplication rate of the DC voltage output from each of the first and second rectification units 421 and 422 depends on the constitution in which a capacitor and a diode are arranged respectively in each of the first and second rectification units 421 and 422.

Referring back to FIG. 1, the high-voltage power supply 1 outputs a high DC voltage output from the first or second rectification unit 14 or 15. The high DC voltage output from the high-voltage power supply 1 is used to drive elements included in an image forming apparatus. The high-voltage power supply 1 may be embodied in various ways according to a manner in which output terminals of the first and second rectification units 14 and 15 are connected.

According to one embodiment of the present general inventive concept, in the high-voltage power supply 1, the first and second rectification units 14 and 15 are connected to one output terminal. Thus, the high-voltage power supply 1 outputs a high DC voltage output from the first or second rectification unit 14 or 15 via one output terminal. That is, both the output terminals of the first and second rectification units 14 and 15 are connected to one output terminal. Thus, elements included in an image forming apparatus are connected to the output terminal of the high-voltage power supply 1, and the high DC voltage is thus applied to the elements via the output terminal of the high-voltage power supply 1. Since the transformation unit 113 is connected to only the first or second rectification unit 14 or 15 according to the switching operation of the switching unit 12, high DC voltages, the polarities and multiplication rates of which are different from one another, may be applied to the elements of the image forming apparatus, which are connected to the output terminal of the high-voltage power supply 1.

According to another embodiment of the present general inventive concept, in the high-voltage power supply 1, the first and second rectification units 14 and 15 each have output terminals that are separated from each other, and the high-voltage power supply 1 outputs a high DC voltage output from the first or second rectification unit 14 or 15 via one of the outputs terminals of the first and second rectification units 14 and 15. That is, since the output terminals of the high-voltage power supply 1 are connected to the elements included in the image forming apparatus, the high DC voltages, the polarities and multiplication rates of which are different from one another may be applied to the elements of the image forming apparatus.

Figure 5A:
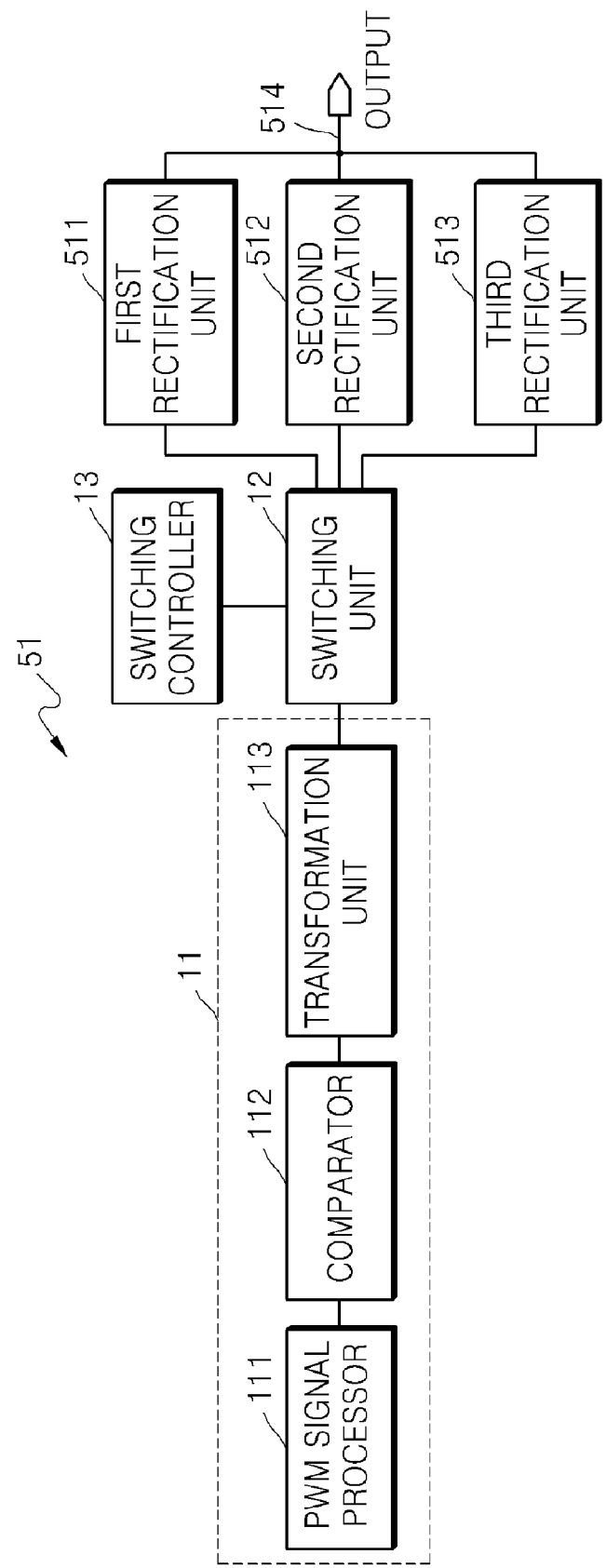
FIG. 5A is a block diagram of a high-voltage power supply that includes an output terminal according to another embodiment of the present general inventive concept.
Figure 5B:
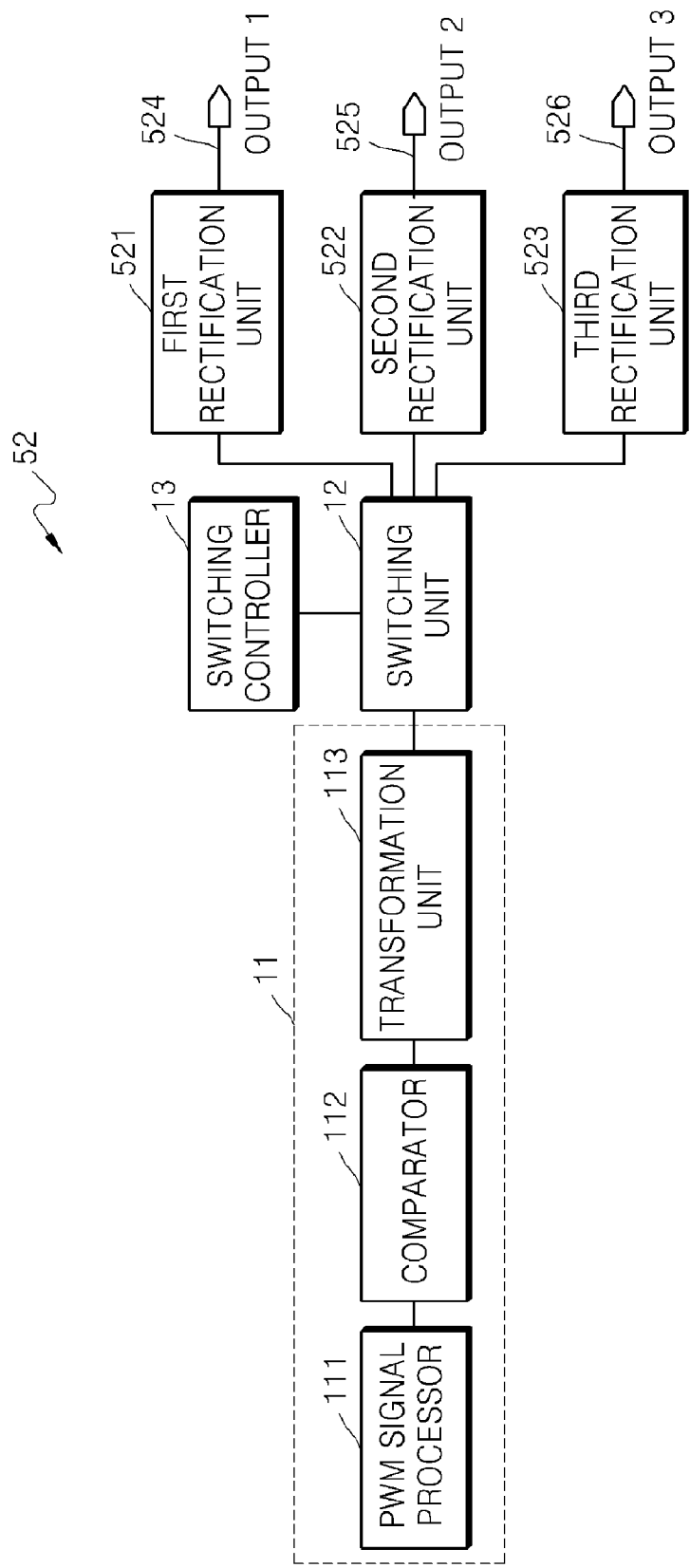
FIG. 5B is a block diagram of a high-voltage power supply that includes a plurality of output terminals according to another embodiment of the present general inventive concept

FIG. 5A is a block diagram of a high-voltage power supply 51 that includes an output terminal 514 according to another embodiment of the present general inventive concept. FIG. 5B is a block diagram of a high-voltage power supply 52 that includes a plurality of output terminals 524, 525, and 526 according to another embodiment of the present general inventive concept. In FIGS. 5A and 5B, a power transformation unit 11 that includes a PWM signal processor 111, a comparator 112, and a transformation unit 113, a switching unit 12, and a switching controller 13 are the same as those illustrate in FIG. 1.

In the high-voltage power supply 51, all output terminals of a first rectification unit 511, a second rectification unit 512, and a third rectification unit 513 are connected to the output terminal 514. Thus, the high-voltage power supply 51 outputs a high DC voltage output from the first rectification unit 511, the second rectification unit 512, or the third rectification unit 513 via the output terminal 514. That is, the high-voltage power supply 51 may apply the high DC voltage to elements included in an image forming apparatus connected to the output terminal 514 via the output terminal 514.

In the high-voltage power supply 52, a first rectification unit 521, a second rectification unit 522, and a third rectification unit 523 have output terminals 524, 525, and 526 that are separated from one another, respectively. Thus, the high-voltage power supply outputs a high AC voltage output from the first rectification unit 521, the second rectification unit 522, or the third rectification unit 523 via one of the output terminals 524, 525, and 526, respectively. That is, the high-voltage power supply 51 may apply the high DC voltage to the elements included in the image forming apparatus, which are connected to the output terminals 524, 525, and 526, via the output terminals 524, 525, and 526, respectively. For example, when the first rectification unit 521 is connected to the transformation unit 113 according to a switching operation of the switching unit 12, a high DC voltage output from the first rectification unit 521 is connected to one of the elements of the image forming apparatus connected to the output terminal 524 of the first rectification unit 521.

Figure 6A:
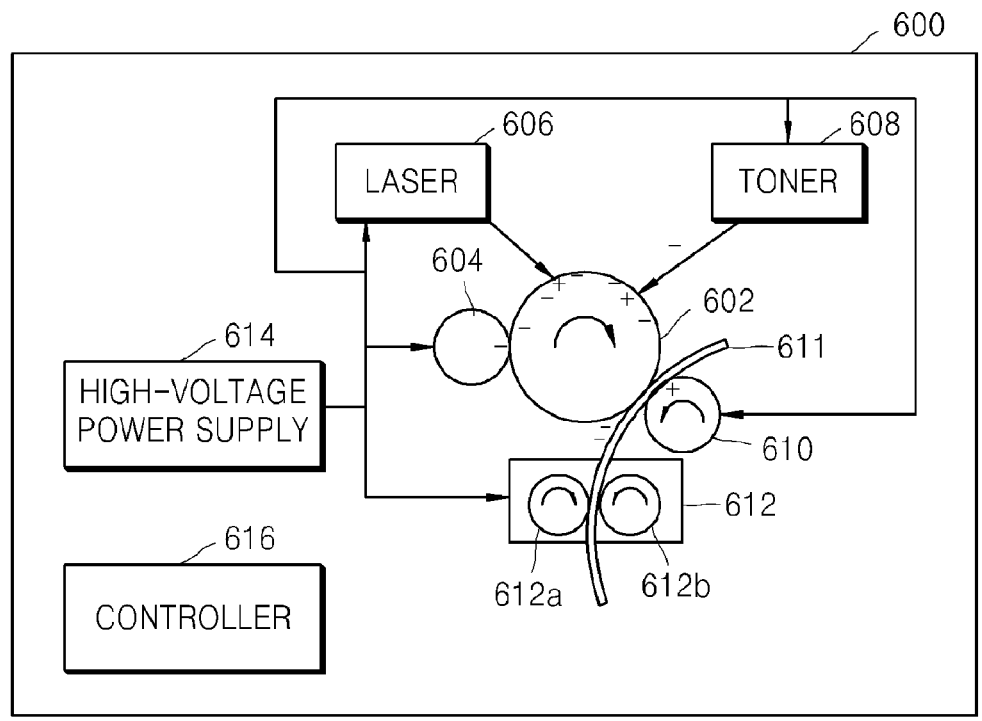
FIGS. 6A and 6B illustrate a block diagram of an image-forming device according to an embodiment of the present general inventive concept.
Figure 6B:
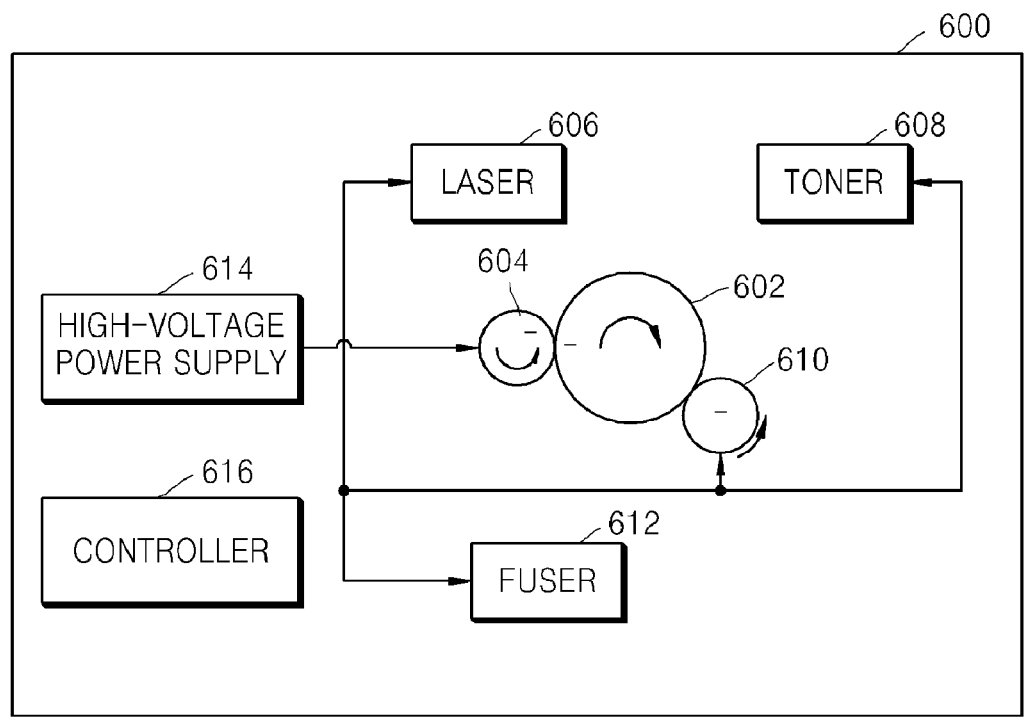

FIGS. 6A and 6B illustrate an image-forming device 600 according to an embodiment of the present general inventive concept. As discussed previously, the image-forming device 600 may include a photoconductive drum 602, a charging roller 604, a laser 606, a toner supply 608, a transfer roller 610, and a fuser 612. The above image-forming elements are examples only, and the image forming apparatus 600 may include additional or different image-forming elements. A high-voltage power supply 614 may provide power to one or more of the image-forming elements and the controller 616 may control the high-voltage power supply 614 and the image-forming elements to control operation of the image-forming apparatus.

During operation, the photoconductive drum 602 may be charged by the charging roller 604 or another charging element to have a negative charge, for example. The laser 606 may emit a laser beam to charge portions of the photoconductive drum 602 with a positive charge corresponding to a latent image. The controller 616 may control the laser 606 to emit the laser beam on the photoconductive drum 602.

The toner supply cartridge 608 supplies toner to the photoconductive drum 602. The toner is charged to have a negative charge so that it sticks to the positively-charged portions of the photoconductive drum 602 corresponding to the latent image formed by the laser beam. A recording medium 611, such as paper, a transparency, or another recording medium, is supplied to the photoconductive drum 602 and passes between a transfer roller 610 and the photoconductive drum 602. When the recording medium 611 is passing between the transfer roller 610 and the photoconductive drum 602, the transfer roller 610 is given a positive charge. The positive charge may be stronger than the positively charged portions of the photoconductive drum 602 corresponding to the latent image so that the negatively-charged toner is transferred to the recording medium 611 from the photoconductive drum 602. The recording medium 611 is transferred to a fuser 612 which may include heated rollers 612a, 612b to fuse the toner to the recording medium 611.

As illustrated in FIG. 6B, after the recording medium 611 has passed between the photoconductive drum 602 and the transfer roller 610, the transfer roller 610 is charged with a negative charge to repel any negatively-charged toner that may have adhered to the transfer roller 610 during transfer from the photoconductive drum 602 to the transfer roller.

Figure 7A:
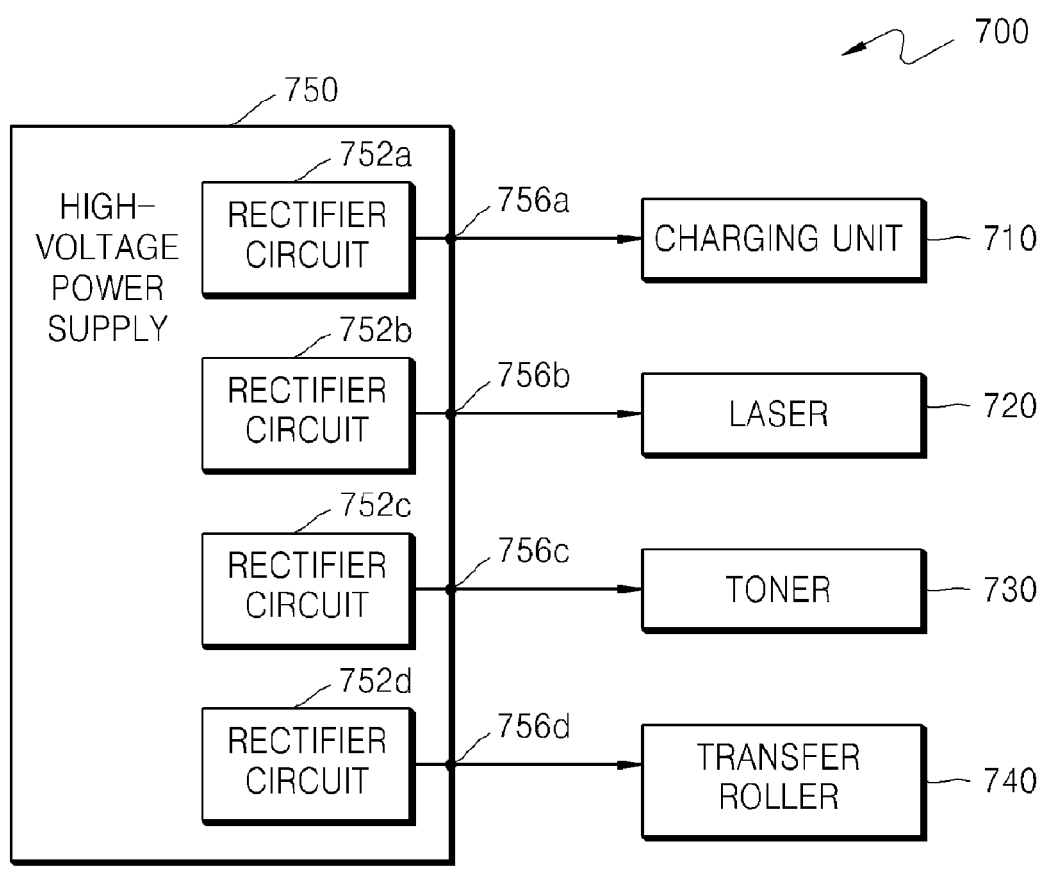
FIGS. 7A-7D illustrate various output configurations from a high-voltage power supply to image-forming elements according to embodiments of the present general inventive concept.

FIGS. 7A-7D illustrate embodiments having different output configurations of the high-voltage power supply 750 of an image-forming apparatus 700. In FIG. 7A, the high-voltage power supply 750 includes rectifier circuits 752a, 752b, 752c, and 752d, each connected to a separate output terminal 756a-756d of the high-voltage power supply 750, respectively. Each output terminal 756a-756d is connected to a respective image forming element. In FIGS. 7A-7D, the image-forming elements include a charging unit 710, a laser 720, a toner supply cartridge 730, and a transfer roller 740. However, these image-forming elements are only examples, and a high-voltage power supply according to the present general inventive concept may provide power to different and additional image-forming elements. In FIG. 7A, since each image forming element 710-740 is connected to a separate output terminal 756a-756d, a controller may not needed to control power to the image-forming elements 710-740 after the power is output from the high-voltage power supply 750.

Figure 7B:
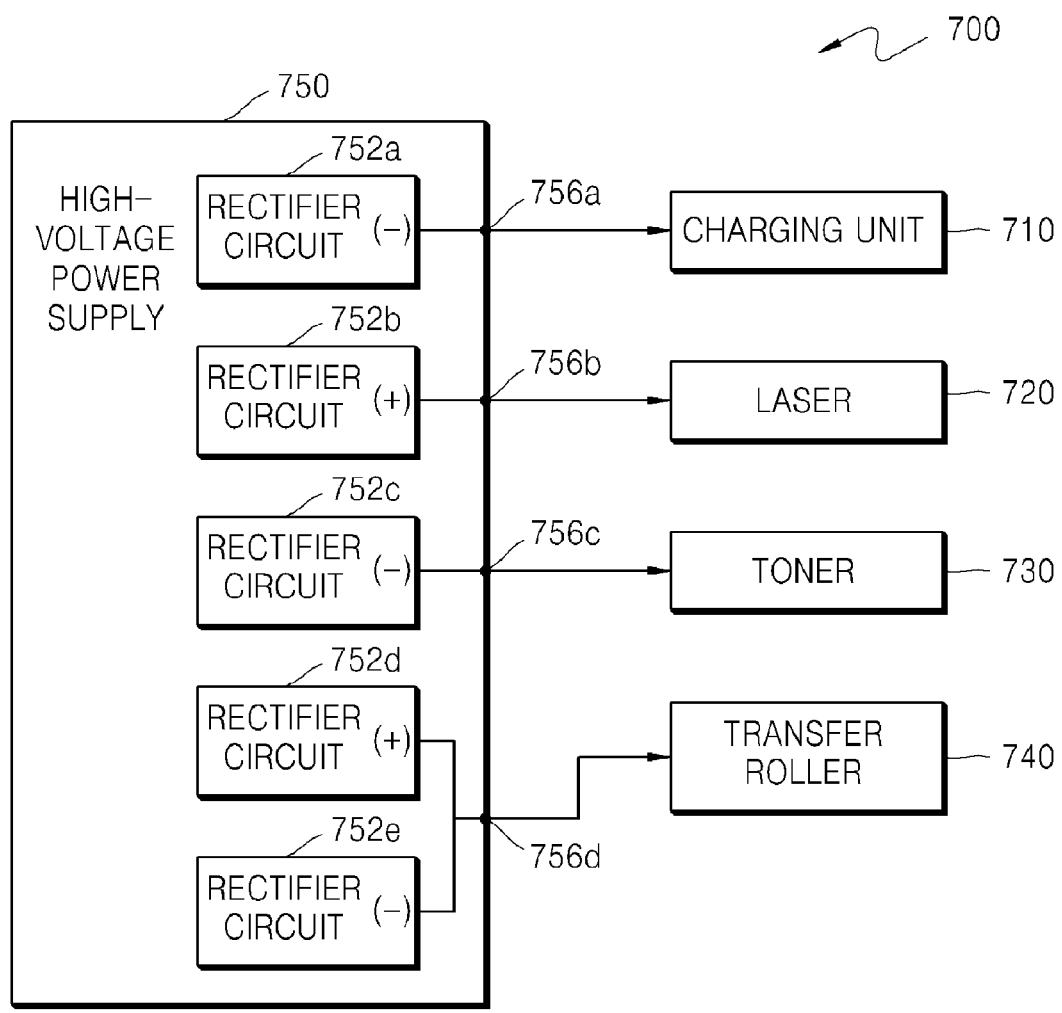

FIG. 7B illustrates an embodiment in which the charging unit 710, laser 720, and toner 730 are each connected to a single rectifier circuit 752a-752c, respectively, but the transfer roller 740 may be connected to multiple rectifier circuits 752d and 752e. The rectifier circuits 752a-752e may each output a different voltage and a different polarity corresponding to the different image-forming elements 710-740. In this case, since the transfer roller 740 requires voltages having different polarities at different stages of the image-forming process, the transfer roller 740 may be connected to a first rectifier circuit 752d that outputs a voltage having a positive polarity and a second rectifier circuit 752e that outputs a voltage having a negative polarity.

Figure 7C:
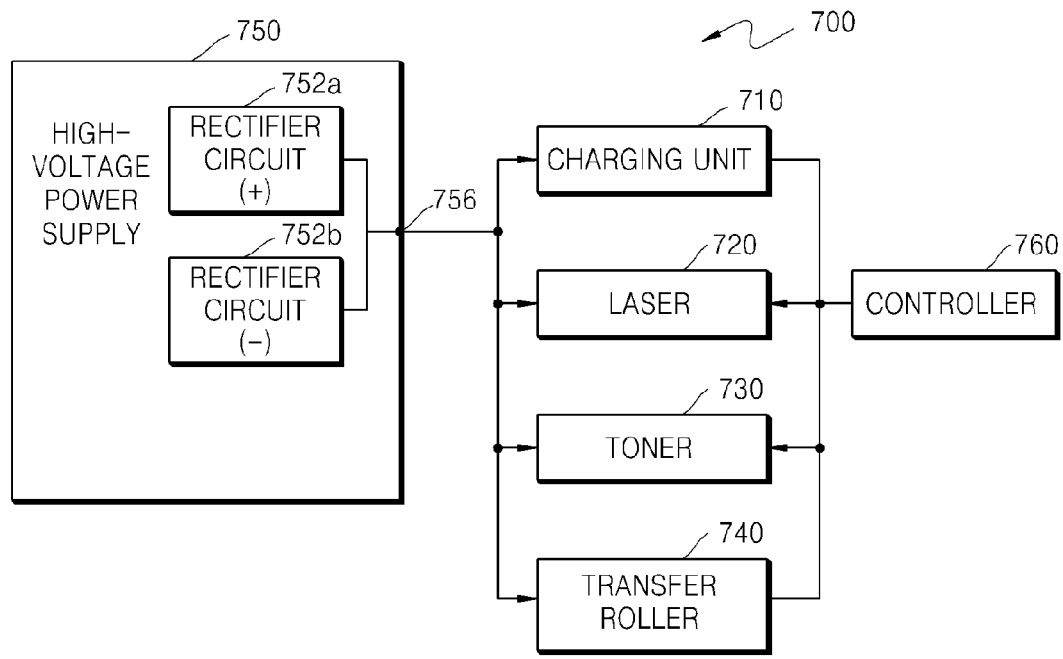

FIG. 7C illustrates the image-forming elements 710-740 all connected to a same output terminal 756 of the high-voltage power supply 750. In such a case, the image-forming elements 710-740 may be controlled by a controller 760 which may determine one or more of the image-forming elements to use the power output from the high-voltage power supply 750. If the image-forming elements 710-740 all require a same high-voltage level, the high-voltage power supply 750 may include only two rectifier circuits 752a and 752b corresponding to voltages having different polarities. Alternatively, the high-power power supply 750 may include a separate voltage-level-generating portion (not shown).

Figure 7D:
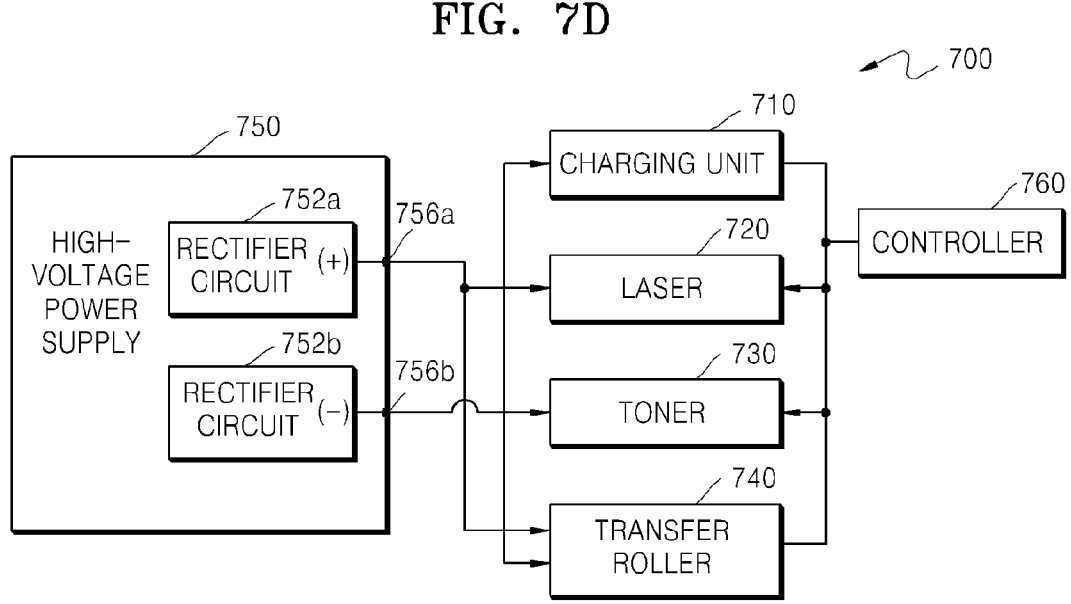

FIG. 7D illustrates a high-voltage power supply 750 having a first output 756a to output a voltage of a first polarity and a second output 756b to output a voltage of a second polarity.

Figure 8:
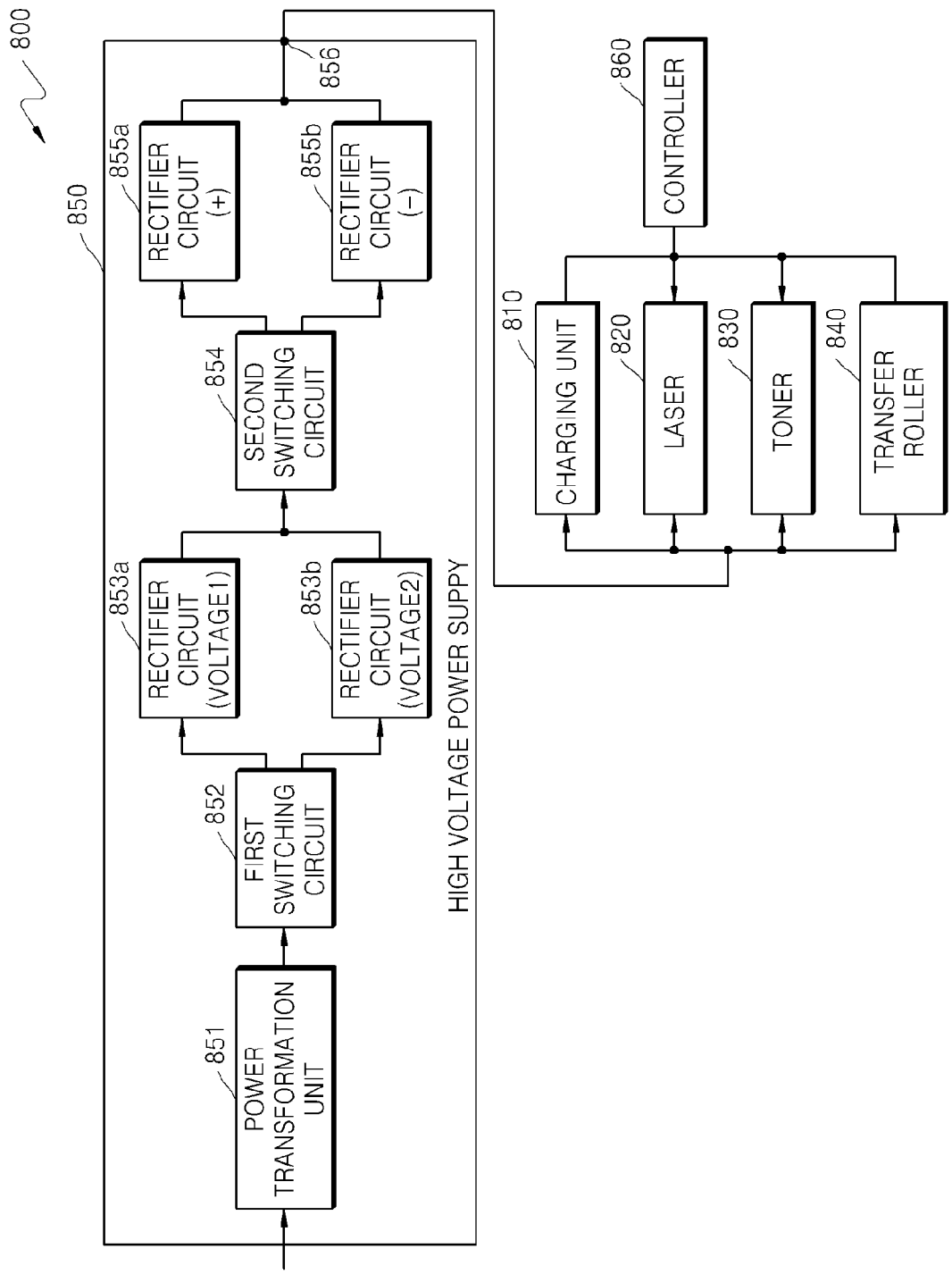
FIG. 8 illustrates another embodiment of a high-voltage power supply according to the present general inventive concept.

FIG. 8 illustrates an image-forming device 800 according to another embodiment of the present general inventive concept. The image-forming device 800 may include one or more image-forming elements, such as a charging unit 810, a laser 820, a toner supply cartridge 830, and a transfer roller 840 that receive power from a high-voltage power supply 850. One or more of the image-forming elements 810-840 and the high-voltage power supply 850 may be controlled by a controller 860.

The high-voltage power supply 850 may include a power transformation unit 851 similar to the power transformation unit 11 of FIG. 1. The power transformation unit 851 may output a high-voltage AC signal to a first switching circuit 852. The first switching circuit 852 may be controlled to output the high-voltage AC signal to one of the rectifier circuits 853a and 853b, depending on a desired output voltage. The output from one of the rectifier circuits 853a and 853b may be output to a second switching circuit 854. The first and second switching circuits 852 and 854 may be similar to any one of the switching circuits of 2A-2D and 3, for example.

The second switching circuit 854 may be controlled to output the high-voltage DC signal to one of the rectifier circuits 855a and 855b depending on a desired polarity of an output voltage of the high-voltage power supply 850. Alternatively, the second switching circuit 854 may connect the high-voltage DC signal of the rectifier circuits 853a and 853b with either the output terminal 856 or a rectifier circuit to change a polarity of the output signal. The rectifier circuits 853a, 853b, 855a, and 855b may be similar to any one of the rectification units 411, 412, 421, and 422 illustrated in FIGS. 4A and 4B, for example.

According to the above embodiments of the present general inventive concept, it is possible to reduce the total number of circuit devices to be included in a high-voltage power supply usable in an image forming apparatus, e.g., a laser printer or a laser multi-functional device, to reduce the size of the high-voltage power supply and simplifying the circuit construction of the high-voltage power supply. While the above embodiments refer to an image-forming device or apparatus, a high-voltage power supply according to the present general inventive concept may be used in any imaging device or any device in which it is necessary to supply high voltages having different polarities to different units or devices.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A high-voltage power supply usable in an image forming apparatus, the high-voltage power supply comprising:
a power transformation unit to generate an alternate-current (AC) voltage by transforming a voltage applied to the high-voltage power supply;
rectification units to respectively rectify the AC voltage into different direct-current (DC) voltages; and
a switching unit to individually connect the power transformation unit to the rectification units.

2. The high-voltage power supply of claim 1, wherein the switching unit selectively connects the power transformation unit to the rectification units according to a control signal that indicates an element of the image forming apparatus that is to be applied a corresponding one of the DC voltages generated by the high-voltage power supply.

3. The high-voltage power supply of claim 2, further comprising:
a switching controller to transmit the control signal to the switching unit, wherein the high-voltage power supply applies the DC voltage output from the one of the rectification units to one of the elements of the image forming apparatus according to the control signal.

4. The high-voltage power supply of claim 3, wherein:
the rectification units rectify the AC voltage into respective DC voltages having different polarities; and
at least one of the elements of the image forming apparatus is driven when one of the DC voltages is applied to the at least one element.

5. The high-voltage power supply of claim 1, wherein the DC voltages have different multiplication rates.

6. The high-voltage power supply of claim 5, wherein the DC voltages have the same polarity.

7. The high-voltage power supply of claim 1, wherein the power transformation unit comprises a comparator to compare a signal obtained by filtering an input pulse width modulated signal with a reference voltage and to compare the DC voltages with the reference voltage, the comparator comprising input terminals to which the filtered signal, respective ones of the DC voltages, and the reference voltage are applied according to a polarity of the DC voltage.

8. The high-voltage power supply of claim 1, wherein the control signal is a pulse-width modulation (PWM) signal.

9. A high-voltage power supply comprising:
a power transformation unit to generate an alternate-current (AC) voltage by transforming a voltage applied to the high-voltage power supply;
rectification units to respectively rectify the AC voltage into different direct-current (DC) voltages that are applied to respective elements of an image forming apparatus; and
a switching unit to individually connect the power transformation unit to the rectification units according to operational states of the elements of the image forming apparatus.

10. The high-voltage power supply of claim 9, wherein the switching unit selectively connects the power transformation unit to each of the rectification units according to a control signal that designates which element of the image forming apparatus is to be supplied with a corresponding one of the DC voltages.

11. The high-voltage power supply of claim 10, further comprising:
a switching controller to transmit the control signal to the switching unit,
wherein the high-voltage power supply applies the DC voltage output from one of the rectification units to one of the elements of the image forming apparatus according to the control signal.

12. The high-voltage power supply of claim 11, wherein:
the rectified DC voltages have different polarities; and
at least one of the elements of the image forming apparatus is driven when one of the DC voltages is applied to the at least one element.

13. A high-voltage power supply, comprising:
a power transformation unit to receive a low-voltage power control signal and to output a high-voltage AC signal;
rectifier circuits connected in parallel and connected with the power transformation unit to receive the high-voltage AC signal and to output a rectified high-voltage DC signal; and
a switching circuit to individually control the output of the high-voltage AC signal to the rectifier circuits.

14. The high-voltage power supply according to claim 13, wherein the power transformation unit comprises:
a transformation unit to receive a low-voltage AC signal corresponding to a power input signal and to output a high-voltage AC signal corresponding to the power input signal.

15. The high-voltage power supply according to claim 14, wherein the power transformation unit comprises:
a comparator to receive a first input signal corresponding to the power input signal and a second input signal corresponding to a reference voltage signal and to output the low-voltage AC signal to the transformation unit based on a comparison result.

16. The high-voltage power supply according to claim 15, wherein:
   the power input signal is a pulse-width modulation signal to control a power output of the high-voltage power supply; and
   the power transformation unit further comprises a pulse-width modulation processor to filter the pulse-width modulation signal and to output the filtered pulse-width modulation signal as the first input signal to the comparator.

17. The high-voltage power supply according to claim 16, wherein the comparator receives as the first input signal the filtered pulse-width modulation signal and a feedback signal corresponding to a rectified high-voltage DC signal of the rectifier circuits.

18. The high-voltage power supply according to claim 15, wherein the comparator is an op-amp.

19. The high-voltage power supply according to claim 18, wherein the op-amp includes a first input having a first polarity and a second input having a second polarity opposite the first polarity,
   the reference voltage is input to the first input and the first input signal is input to the second input when the polarity of the rectified high-voltage DC signal is positive, and
   the reference voltage is input to the second input and the first input signal is input to the first input when the polarity of the rectified high-voltage DC signal is negative.

20. The high-voltage power supply according to claim 13, wherein the switching circuit comprises a switching element comprising:
   a single switch input connected to the power transformation unit; and
   switch outputs connected to each of the rectifier circuits, respectively,
   wherein the switching element connects a signal from the switch input to one of the switch outputs.

21. The high-voltage power supply according to claim 13, wherein the switching circuit comprises:
   a single switch input;
   switching elements connected to the switch input; and
   switch outputs respectively connected to the switching elements and the rectifier circuits
   wherein the switching circuit connects the power transformation unit to one of the rectifier circuits by turning on a corresponding one of the switching elements and turning off the remaining switching elements.

22. The high-voltage power supply according to claim 21, wherein the switching elements are transistors.

23. The high-voltage power supply according to claim 13, further comprising:
   a switching controller to generate at least one switching control signal to control the switching circuit.

24. The high-voltage power supply according to claim 23, wherein the switching controller independently generates switching control signals to control respective switching elements of the switching circuit.

25. The high-voltage power supply according to claim 23, wherein:
   the switching circuit comprises two switching elements corresponding to two respective rectifier circuits;
   the switching controller comprises an inverter; and
   the switching controller generates a single switching control signal to control the two switching elements, such that the switching control signal is not inverted to control one of the switching elements, and the switching control signal is inverted to control the remaining switching elements.

26. The high-voltage power supply according to claim 13, wherein:
   the switching circuit is a relay circuit; and
   the switching controller comprises at least one transistor connected to the relay to output the high voltage AC signal to a first one of the rectifier circuits when the transistor is on and to output the high voltage AC signal to a second one of the rectifier circuits when the transistor is off.

27. The high-voltage power supply according to claim 13, wherein the rectifier circuits include a first rectifier circuit, and a second rectifier circuit, and the rectified high-voltage DC signals output from the first rectifier circuit and output from the second rectifier circuit have different polarities.

28. The high-voltage power supply according to claim 13, wherein the rectifier circuits include a first rectifier circuit, and a second rectifier circuit, and the rectified high-voltage DC signals output from the first rectifier circuit and output from the second rectifier circuit have different voltage levels.

29. The high-voltage power supply according to claim 13, wherein at least two of the rectifier circuits are connected to the same output terminal.

30. The high-voltage power supply according to claim 13, wherein at least two of the rectifier circuits are connected to separate output terminals.

31. An image-forming device, comprising:
   image-forming elements to receive a high-voltage DC signal to form an image on a recording medium;
   a high-voltage power supply to supply the high-voltage DC signal to the image-forming elements, the high-voltage power supply comprising:
      a power transformation unit to receive a low-voltage power control signal and to output a high-voltage AC signal;
      rectifier circuits connected in parallel and connected with the power transformation unit to receive the high-voltage AC signal and to output a rectified high-voltage DC signal;
      a switching circuit to control the output of the high-voltage AC signal to the rectifier circuits; and
      a controller to supply the low-voltage power control signal to individually control the supply the high-voltage DC signal to the image-forming elements.

32. The image-forming device according to claim 31, wherein the image-forming elements comprise:
   a photoconductive drum;
   a charging unit to charge the photoconductive drum;
   a laser unit to form a latent image on the photoconductive drum;
   a transfer roller to transfer a toner image from the photoconductive drum to a recording medium; and
   a fuser to fuse the toner image to the recording medium.

33. The image-forming device according to claim 31, wherein the controller provides switching control signals to control the switching circuit of the high-voltage power supply to connect the power transformation unit to one of the rectifier circuits.

34. The image-forming device according to claim 31, wherein:
- the rectifier circuits are connected to a single output terminal; and
- the controller controls the image-forming elements to determine which of the image-forming elements is supplied with the high-voltage DC signal.

35. The high-voltage power supply according to claim 13, wherein the output of the rectifier circuits are separated from one another.

* * * * *